United States Patent
Goldenblum

(10) Patent No.: US 6,167,704 B1
(45) Date of Patent: Jan. 2, 2001

(54) ENERGY GENERATION DEVICE

(76) Inventor: Haim Goldenblum, Kfar Reshef 13, Nof Yam, Herzlia 46324 (IL)

(*) Notice: Under 35 U.S.C. 154(b), the term of this patent shall be extended for 0 days.

(21) Appl. No.: 09/263,849

(22) Filed: Mar. 8, 1999

Related U.S. Application Data

(63) Continuation-in-part of application No. PCT/IL97/00299, filed on Sep. 8, 1997.

(30) Foreign Application Priority Data

Sep. 8, 1996 (IL) .......................................................... 119216
Feb. 17, 1997 (IL) .......................................................... 120242

(51) Int. Cl.[7] .................................................. F01K 27/00
(52) U.S. Cl. ............................................. 60/641.1; 60/649
(58) Field of Search ................................. 60/641.1, 649, 60/202, 203.1

(56) References Cited

U.S. PATENT DOCUMENTS

| | | |
|---|---|---|
| 3,128,595 | 4/1964 | Meyer . |
| 3,380,249 | 4/1968 | Meckel . |
| 3,443,362 | 5/1969 | Ebert . |
| 3,552,125 | 1/1971 | Banks et al. . |
| 3,576,107 | 4/1971 | Nakanishi . |
| 3,604,209 | 9/1971 | King . |
| 3,789,608 | 2/1974 | Free . |
| 3,969,646 | 7/1976 | Reader et al. . |
| 4,104,875 * | 8/1978 | Birner et al. .......................... 60/202 |
| 4,191,888 | 3/1980 | Meadows . |
| 4,259,300 * | 3/1981 | Lieffers ............................ 60/641.2 X |
| 4,516,050 | 5/1985 | Russo . |
| 4,742,682 * | 5/1988 | Assaf et al. ........................ 600/641.1 |
| 4,873,467 | 10/1989 | Kaufman et al. . |
| 5,005,361 * | 4/1991 | Phillips ............................... 60/202 X |
| 5,239,820 | 8/1993 | Leifer et al. . |
| 5,269,131 | 12/1993 | Brophy . |
| 5,448,883 | 9/1995 | Meserole, Jr. et al. . |
| 5,689,950 | 11/1997 | Smith . |

FOREIGN PATENT DOCUMENTS

| | | |
|---|---|---|
| 41 14 910 | 11/1992 | (DE) . |
| 5-248346 | 9/1993 | (JP) . |

* cited by examiner

Primary Examiner—Hoang Nguyen
(74) Attorney, Agent, or Firm—Browdy and Neimark

(57) ABSTRACT

Method, device and system for converting the kinetic energy of randomly moving particles into a usable form of mechanical energy. The device (74) includes a cylinder (75) which supports selectively permeable membranes (76) covered on one side with molecular gates. The cylinder (75) is encircled by another body (c) having stationary blocking surfaces (d) interposed between the selectively permeable membranes (76) to restrict the motion of particles contained between the cylinder (75) and the body (c). In a different embodiment, the device (74) may include a magnet for effecting ion separation. The method comprising the steps of selectively blocking particles moving in one general direction within the device while permitting the passage of particles in the opposite direction such that a vectorial force acting on the apparatus is generated.

25 Claims, 12 Drawing Sheets

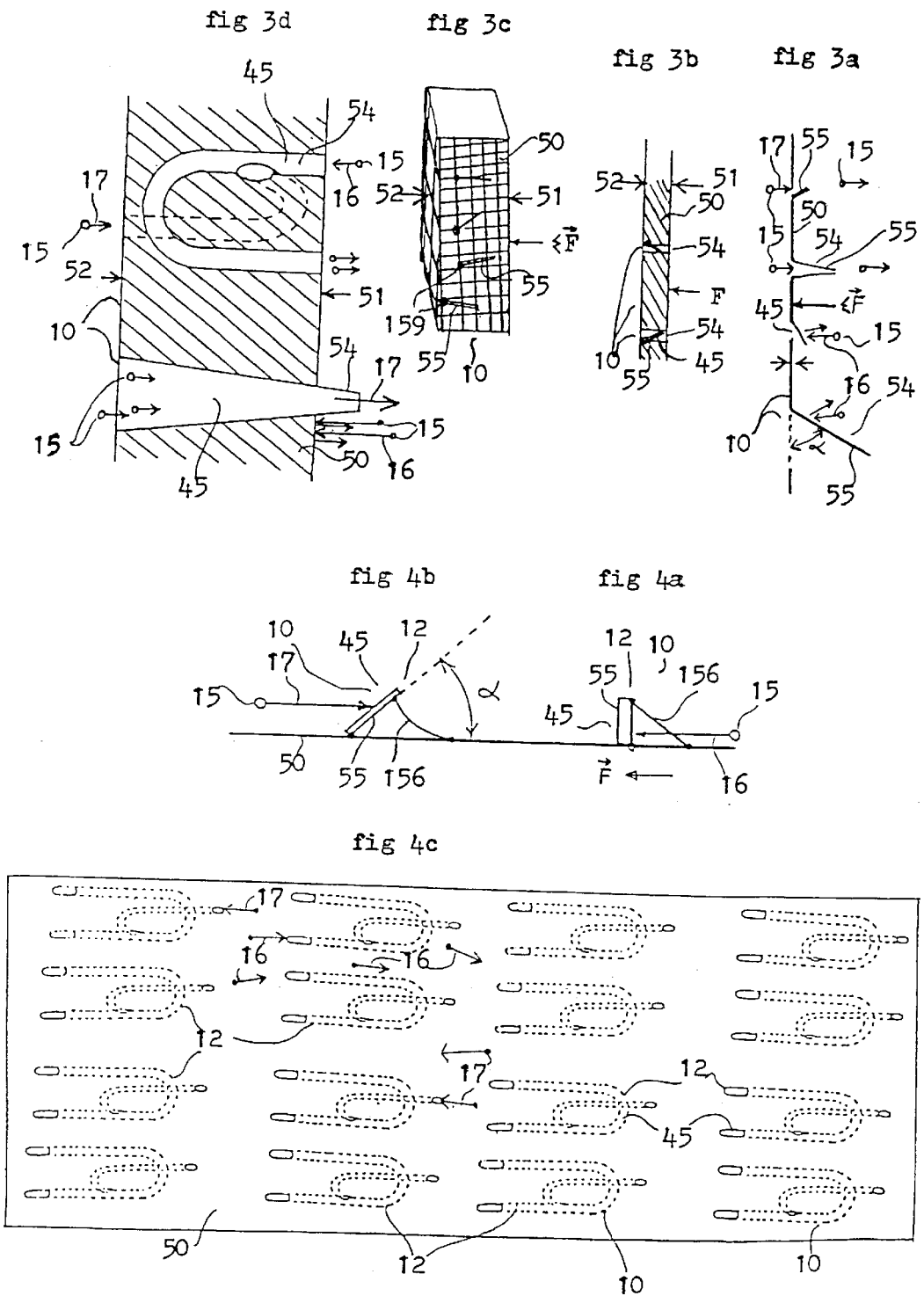

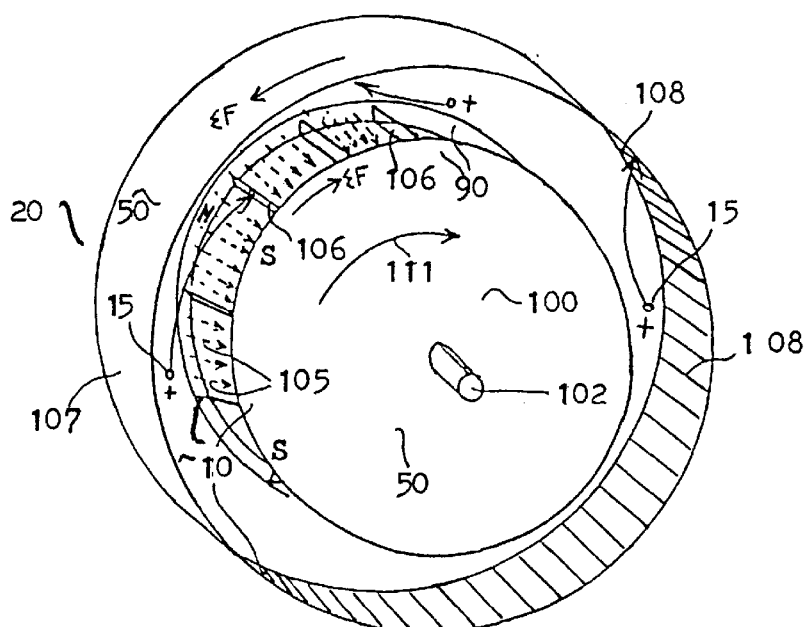
fig 5
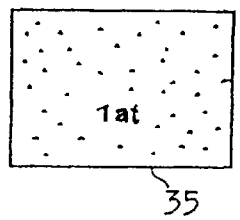
fig 6a
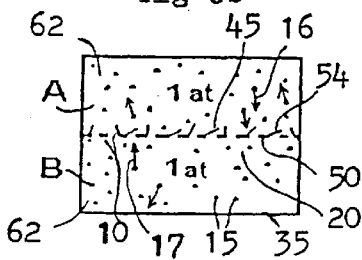
fig 6b
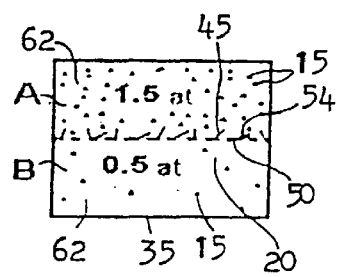
fig 6c
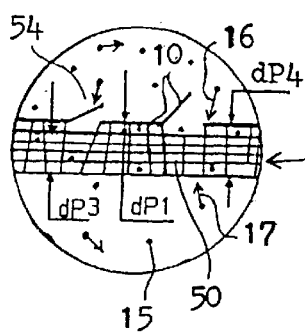
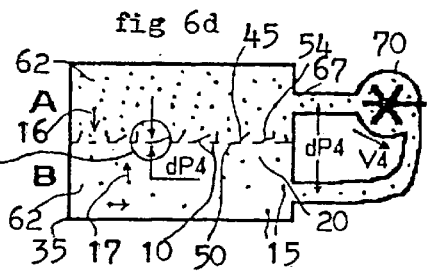
fig 6d
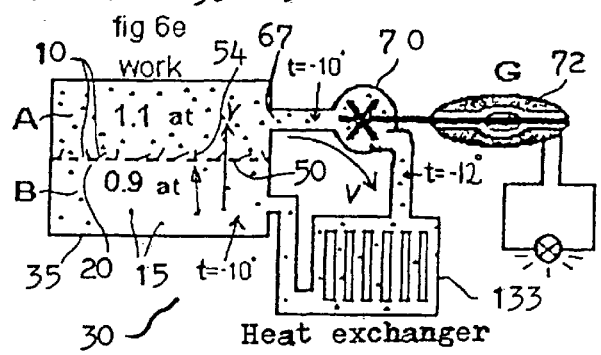
fig 6e

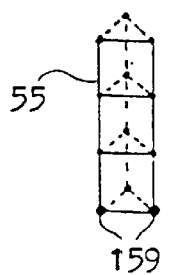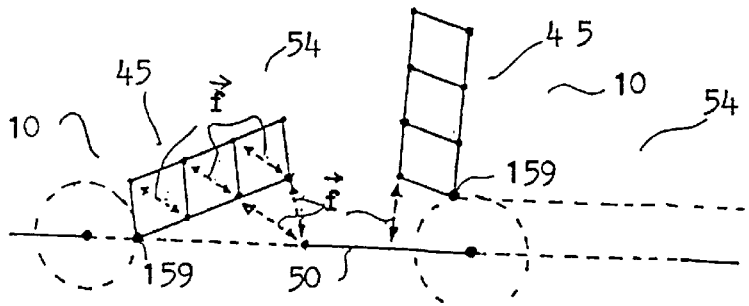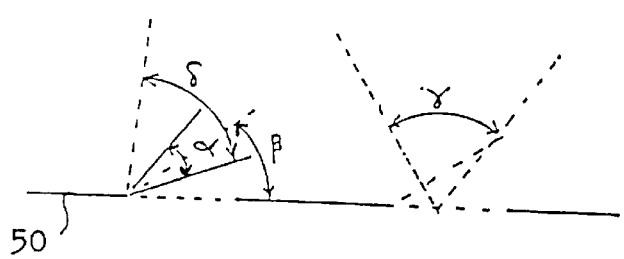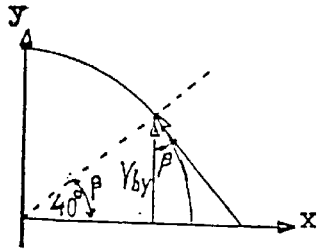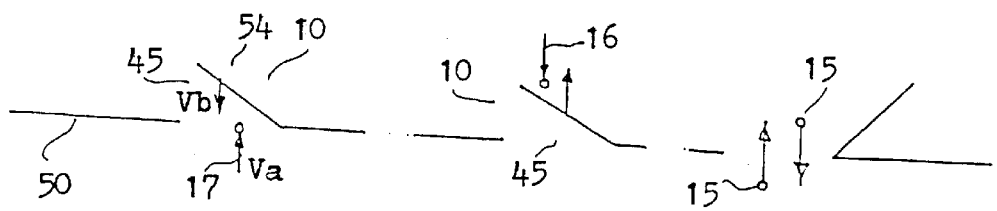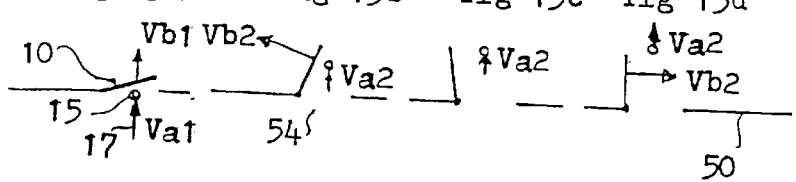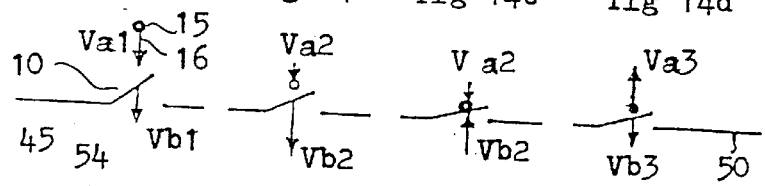

fig 31
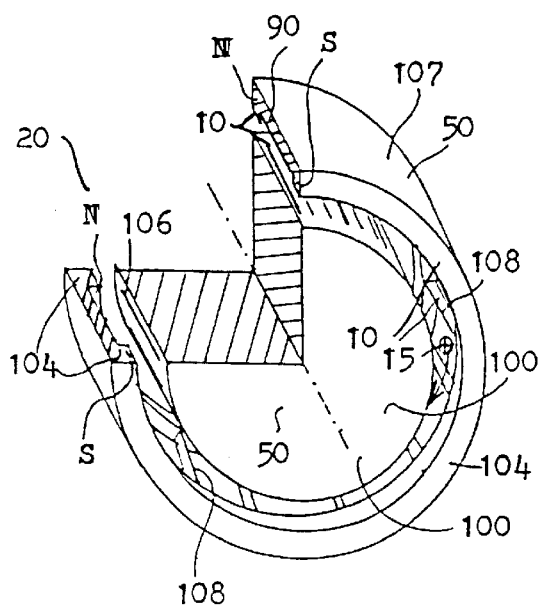
fig 32
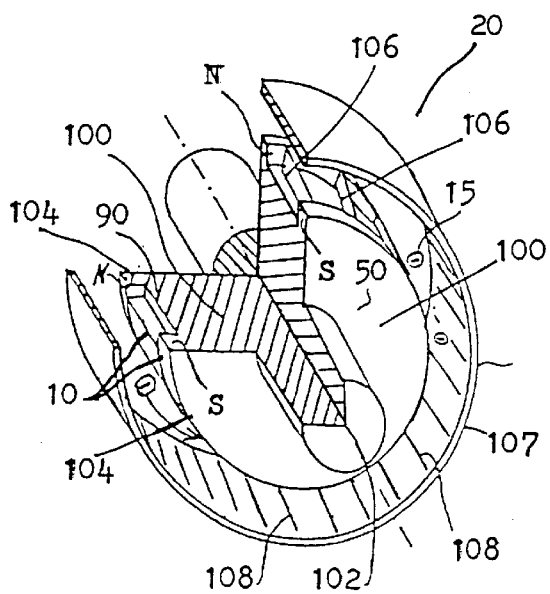
fig 33
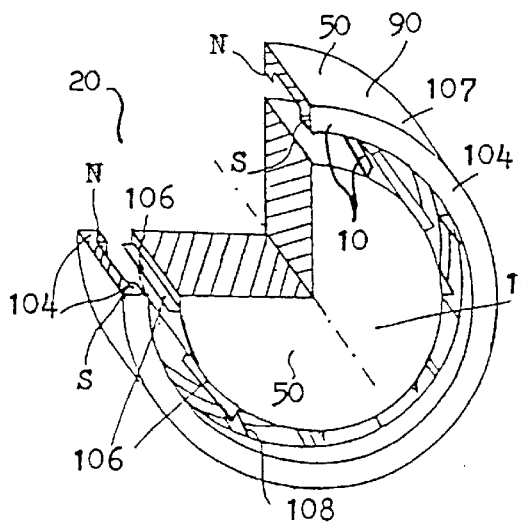
fig 34

ENERGY GENERATION DEVICE

This Appln is a C-I-P of PCT/IL97/00299 filed Sep. 8, 1997.

FIELD AND BACKGROUND OF THE INVENTION

The present invention relates to a method, mechanism, device and system for converting environmental energy especially of an environmental heat (kinetic energy of randomly moving particles, meaning, with no need of a temperature differences from the first place in this environment), into a usable form of energy (e.g., mechanical or electrical energy).

Environmental friendly prior state of the state of the art technologies in the field of energy conversion teach the use of solar, wind and sea waves as a primary source of readily available energy to be converted into electrical energy and the like.

Such prior state of the state of the art technologies have a major drawback since they depend upon the availability of the primary energy sources. For example solar energy is not available during night time. Wind is not always blowing at a constant speed and direction, whereas sea waves to a great extent depend upon tide cycles.

The prior art fails to teach the use environmental heat or kinetic energy of particles as an energy source for such conversions.

As well known, any fluid material, such as gas and liquid or the like, is made of more or less freely moving particles (atoms, molecules, clusters thereof, etc.) which at a given temperature acquire a certain kinetic energy or heat energy value (90 kcal for $m^3$ of air, 300 kcal for 1 kg of water under environmental conditions).

According to the present invention the kinetic energy of particles of a fluid (gas or liquid) is used as a primary energy source for conversion into a usable form of energy, such as an electrical energy.

Also we have an academic support include in writing attached by this, of the physicist Alex Lifshits from ISRAEL.

SUMMARY OF THE INVENTION

According to the present invention there are provided a method, mechanism, device and system for converting environmental energy (especially of heat) into a useful form of energy, by utilizing the kinetic energy of randomly moving particles.

According to further features in preferred embodiments of the invention described below the mentioned above method comprising an operation steps of a mechanism which selectively blocks more particles that are moving in one general direction. (linear and/or rotary) than particles that are moving in the opposite direction to the first one, for creating an equivalent vectorial force, $\Sigma Fx$, and/or a pressure difference and/or a flow of gases/liquids particles, and by these supply energy for different purposes.

According to still further features in the described preferred embodiments said force that created on said mechanism is usable for moving a body which the mechanism is connected to.

According to still further features in the described preferred embodiments the body is a permeable membrane.

According to still further features in the described preferred embodiments the mechanism comprising at least one of the following:

1) a unidirectional permeable surface (also a membrane) to the moving particles,
2) a tiny unidirectional elements that their smallest dimension (from x,y,z dimensions) can be from one single atom, till 1 mm, and can be with a moveable part or stationary, and can comprising at least one of the following: a) unidirectional gates, or b) unidirectional blocks, etc.
3) a magnet that operate in interaction with ions and muzzles.

Also said mechanism can comprising additionally a barrier(also in plural)

According to further features in preferred embodiments of the invention the mentioned above device comprising the mentioned above mechanism and aid means comprising a body on which the mentioned mechanism will be attached to, and can be unseparated from said mechanism and in some of this cases we will related to this body as said mechanism, also the mentioned above aid means are barriers, a pivot and etc.

According to further features in preferred embodiments of the invention described below the mentioned above system comprising the mentioned above device which is including the mentioned a mechanism, and by them, it is converting environmental energy (especially of heat) into a useful form of energy, and supply energy for different purposes. Also the system can comprise a randomly moving particle (atoms, molecules, clusters thereof, etc.) that the mentioned above mechanism substantially selectively blocks by there direction, Also this system can contain a container in which will be the above mentioned device, and also some kind of a transmission system and also a heat exchanger.

According to still further features in one of the described preferred embodiments the particles are ions.

According to still further features in preferred embodiments of the invention described below, there is provided a method for manufacturing a mechanism which converting kinetic energy of particles into a usable form of energy.

The present invention successfully addresses the shortcomings of the presently known configurations by providing a method mechanism device and system for converting kinetic energy of randomly moving particles into a usable form of energy, which operate under any conditions.

BRIEF DESCRIPTION OF THE DRAWINGS

The invention herein described, by way of example only, with reference to the accompanying drawings, wherein:

FIGS. 3a–d are schematic depiction of different kinds of tiny gates formed in or on the body.

FIGS. 4a–c presents tiny unidirectional stoppers according to the present invention;

FIG. 5 is a three-dimensional view of a device according to the present invention, supplemented with a magnet/electromagnet, capable of pulling or pushing ions moving in certain directions and blocking them employing suitable mechanical means;

FIGS. 6a–e present a device which causes particles of a fluid (gas or liquid) to redistribute such that their kinetic energy may be converted into another form of energy;

FIGS. 10a–c are schematic depictions of different positions of the gates according to the present invention;

FIGS. 11a–c are schematic depictions demonstrating the position of the gates;

FIGS. 12a–c are schematic depictions demonstrating the "unprofitable positions" of the gates according to the present invention;

FIGS. 13a–d and 14a–d are schematic depictions demonstrating the forces exerted on the gates according to the present invention;

FIGS. 31, 32, 33, and 34 are three-dimensional views of devices operating with two bodies of which at least one is also a magnet or an electromagnet, and at least one includes different kinds of muzzles;

DESCRIPTION OF THE PREFERRED EMBODIMENTS

Figure 1:
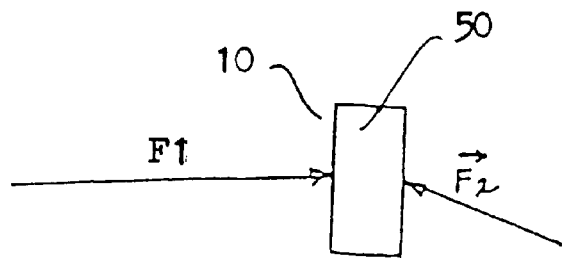
FIG. 1 demonstrate vectorial forces which may operate on a body.

The present invention is of a method, mechanism, device and system for converting environmental energy (especially of heat), with no need of a temperature difference from the first place in the environment, into a usable form of energy, as mechanical or electrical power, and this we achieve by utilizing the kinetic energy of randomly moving particles.

Specifically, the present invention can be used to obtain inexpensive readily available and environmental friendly electrical power.

The principles and operation of a method and apparatus according to the present invention may be better understood with reference to the drawings and accompanying descriptions.

The Method

According to further features in preferred embodiments of the invention as described in drawings 3a–d, 5, 6b–e, 12a . 14a, the mentioned method comprising the steps of the operation of a mechanism-10 which selectively blocks more particles-15 (particles—atoms, molecules, clusters thereof) that are moving in one general direction-16 (linear and/or rotary) than particles-15 that are moving in the opposite direction-17, this method of selectively blocking the particles can be done in one step of selectively blocking the particles by their direction, as described for example in FIGS. 6b–e, which in there we are using a permeable membrane-50, covered on one side of it with a unidirectional molecular gates with a moveable part, and this gates are opening and closing by themselves at least part of the time, because their own kinetic energy and their small mass, and these gates are blocking particles-15 that are moving in one general direction-16 and coming from one side-A of the membrane-50, and let of passing through of particles-15 that are moving in the opposite direction-16 and coming from opposite side-B, or the selectively blocking of particles can be done in two steps: a) selectively diverting particle-15 by their direction, in FIG. 5 for example, we do it by using a magnet-90 that is diverting ions-15. b) blocking the diverted particles-15 which were moving in one general direction, by muzzles-106,108, that can be attached to a body-50,100,107, so more ions-15 will heat this muzzles from one side of them than from their other side, or alternatively for (b), not blocking the diverted particles-15 that are moving in one general direction, by muzzles-106,108, that other wise would do blocked these particles. This method of selectively blocking the particles, can provide energy in at least one of the following forms;

a) As described for example in FIGS. 1,2,3a–c,4a, a vectorial force ΣF that can be used for move a body-50 that said mechanism-10 is attached to, For example as described in FIG. 5,31–37 for rotating a body/bodies-50,100,107.

b) As described for example in FIGS. 6d–e, a flow of gases/liquids particles-V, that can be used for example for rotating a turbine-70.

c) As described for example in FIG. 6c, a pressure difference, between two sides of a body(also a surface)-

50 that the said mechanism-10 is attached to, especially if the body-50 is a membrane, and that pressure difference can be used for different purposes, for example for moving a turbine as in paragraph (b) or for moving a piston, or for floating/lifting surfaces in the air/water.

d) A pressure, for example: for operating a compressor or for lifting, or floating, or flying, objects or moving pistons.

e) A subpressure, for example for sucking air/water.

All the mentioned above energy forms supplied, for different purposes are further more described in the Additions and expansions section.

The Mechanism

According to still further features in the described preferred embodiments, As described for example in FIGS. 3a–d,4a–b,5,6b–e, the invention include said mechanism-10 that substantially selectively blocks moving particles-15 by their direction. According to still further feature in the described preferred embodiments, As described for example in FIGS. 6b–e the mentioned mechanism-10 can comprising also a body-50(also a surface and also in plural), which in or on it there is installed at least part of the mechanism-10 (as gates-54 attached to the surface-50), and this body-50 in some cases can be unseparated from said mechanism (also see FIGS. 3a–d), and in some of this cases we may related to this body-50 as said mechanism-10(for example as a unidirectional membrane).

Said mechanism-10 can comprising one of the following:

1) a unidirectional permeable surface (also a permeable membrane) that is permeable to the moving particles, and selectively blocks this particles by their direction. As described for example in FIG. 6e, in one form of the mentioned unidirectional permeable surface we use a permeable membrane-50, covered by a chemically process on one side of it with a unidirectional gates-54 so they become unseparated from this membrane so it becomes as a unidirectional membrane.

2) As describes for example in FIGS. 3a–d,4a–c,21–30 a tiny unidirectional elements-45 that their smallest dimension (from x,y,z dimensions) can be from one single atom, till 1 mm, and can be with a moveable part-55(see FIGS. 21–30) or stationary(see FIGS. 3d,4c), and can comprising at least one of the following: a) unidirectional gates-54, or b) unidirectional blocks-12, and etc.

3) As describes for example in FIG. 5, a magnet-90(also an electromagnet) that operate in interaction with ions-15 and muzzles-106,108 (that can be also a rough surface), etc.

Also said mechanism at the all mentioned above paragraphs can comprising a muzzles(also in plural and can be also a rough surface)

Also as describes for example in FIG. 5, said randomly moving particles-15, at the all mentioned above paragraphs, can be ions-15, which most or all of them are from the same kind of electric charge (+ or −).

Figure 2:
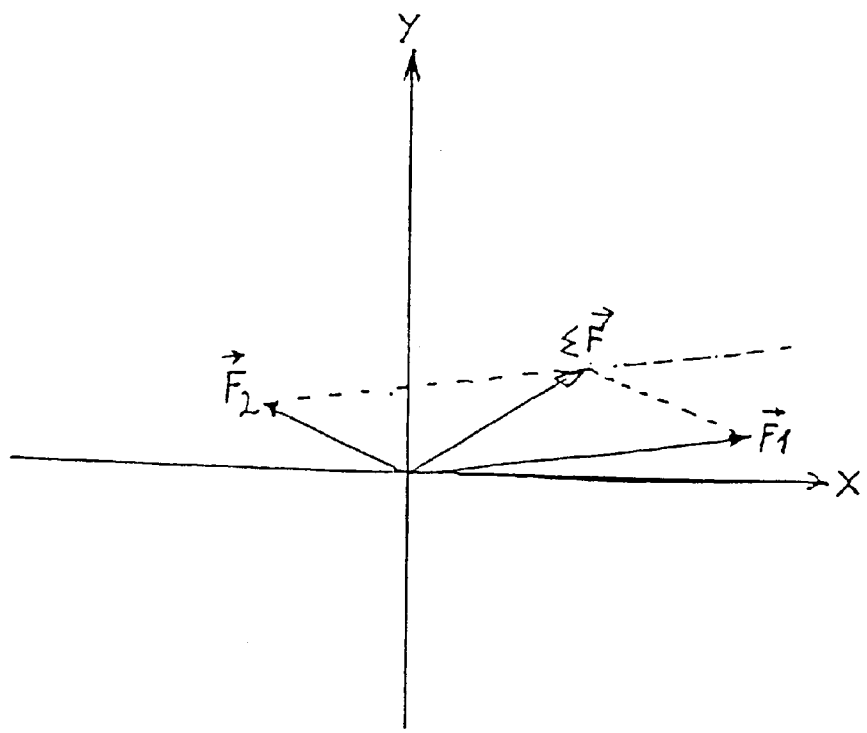
FIG. 2 is a graphic presentation of the vectorial forces which operate the body of FIG. 1.

The connection between the forces, the flow of particles and the pressure difference, that said mechanism is generating FIGS. 1 and 2 demonstrate forces F1 and F2 that operate on the body-50(also a membrane) that in or on it there is installed at least part of the mechanism-10, and their equivalent vectorial force-ΣFx(see FIGS. 3a–c) and the difference of pressure-dP4 on the body-50(see FIGS. 6c–e) and the general flow of the particles(see FIGS. 6d–e), are all other aspects of the selectively blocking of moving particles-15 by the mechanism-10, and the exact connection between these concepts is described in the calculations sheets. In general, the pressures difference is equivalent to the equivalent vectorial force-ΣFx multiplied by the active area of said mechanism-10 (the gates surface/the stoppers surface/the barriers surface, etc.).

The Device

Figure 36:
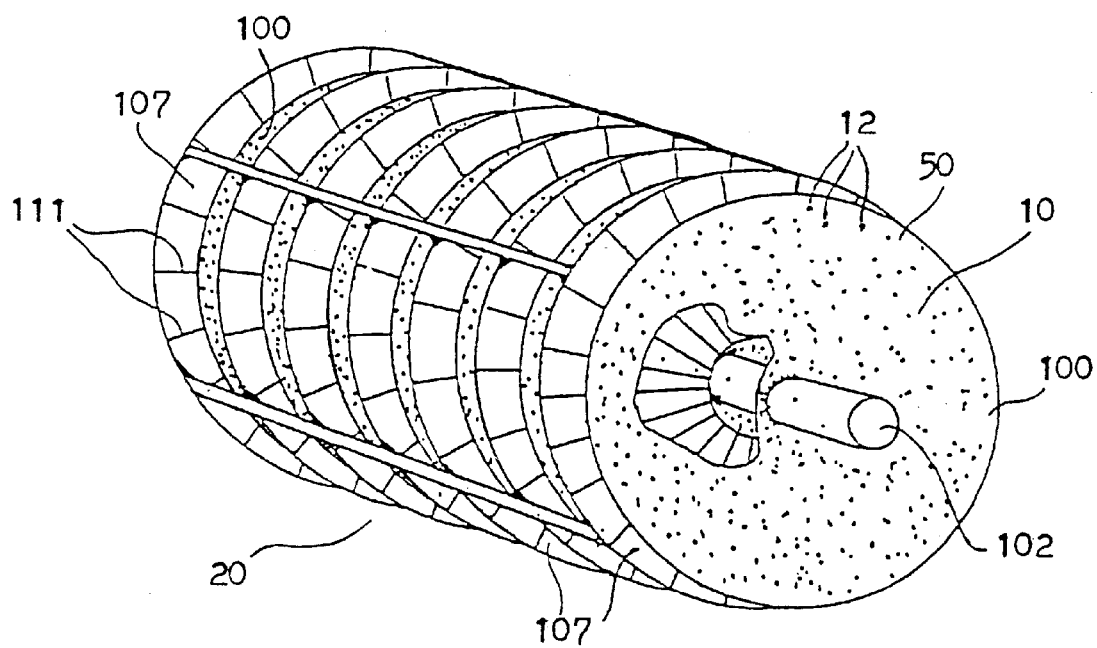
FIG. 36 is a three dimensional view of a device including molecular stoppers according to the present invention, implemented over the surface of a disc body which device includes, and an additional body having a matching configuration, which here includes passive blockers (stoppers) and which is not in direct contact with the first body.

According to further features in preferred embodiments of the invention, As described for example in FIGS. 5,6b–e the invention include the mentioned device-20 comprising at least said mechanism-10, also said device-20 can comprising aid means as a body-50 on which the mentioned mechanism-10 is attached to, and one of the following aid means: a pivot-102, a magnet,-90(also an electromagnet), a battery, and as described for example in FIG. 36, an additional barriers-111. The device enables using the energy we get from the randomly moving particles through the mechanism, by providing a frame to the mechanism operation.

The System

According to further features in preferred embodiments of the invention As described for example in FIG. 6e, the invention includes a system-30 comprising at least the mentioned device-20, that is comprising the mentioned mechanism-10, and also the system-30 can comprise a randomly moving particles-15 (atoms, molecules, clusters thereof, etc.) that said mechanism-10 substantially selectively blocks this moving particles-15 by their direction. Also as described for example in FIGS. 7a–b,8,9,35,37 this system-30 can contain some kind of a container-35 in which will be mentioned device-20, and this container can be closed and sealed to the environment (see FIGS. 7a–b,9,35, 37), or this container-35 can be opened to the environment (see FIG. 8), and also as described for example in FIG. 6e, this system-30 can contain some kind of a transmission system as a turbine-70, and an electric generator-72, and also a heat-exchanger-133. Also as describes for example in FIG. 5, said randomly moving particles-15 in the system-30, can be ions-15, that most or all of them are from the same kind of an electric charge (+ or −).

The descriptions of different kinds of said mechanism

Selective Barrier

According to one embodiment of the present invention, the mechanism include a selective barrier(also a membrane) which is selectively redistribute particles of a fluid (gas or liquid) that are moving across this barrier by the direction of this moving particle. This selective barrier comprising a possibility of thin (less than 2.1 mm) non metallic surface, as ceramics for example, covered with a very thin plating of metal, that its maximal thickness is about 0.2 mm, so more little particles, like hydrogen molecules or Helium atoms or Neon atoms, will pass through it in one direction than in the opposite direction.

Tiny Unidirectional Elements

According to another embodiment of the present invention, As described for example in FIGS. 3a–d,4a–c, 6b–e,21–30, the mentioned before mechanism-10 is comprising a tiny unidirectional elements-45, that their smallest dimension (from x,y,z dimensions) can be from one single atom, till 1 mm, and this elements-45 are selectively block particles-15 of a fluid (as gas or liquid) by their direction, and this element-45 can be with a moveable part-55(see FIGS. 21–30) which is mainly molecular size, or stationary (see FIGS. 3d,4c), and this elements-45 can comprising at least one of the following: a) unidirectional gates-54(see FIGS. 3a–d,6b–e), or b) unidirectional blocks-12(see FIGS. 4a–c).

As described for example in FIGS. 3a–d,4a–c,6b–e, this elements-45 can be on or in a body-50, preferably a surface, which can be (not has to be) permeable to the moving particles-15, like a membrane, especially when we deal with said gates-54, and most or all of this unidirectional elements-45 are facing to the same direction, so they together selectively block more particles-15 that move in one direction-16, than particles-15 that move in the opposite direction-17, and thereby they generate a flow of particles-15 through the mechanism-10, and an equivalent vectorial force-$\Sigma Fx$ that operate on the mechanism-10(also see FIG. 2), and also can generate a pressure difference across the mechanism, which thereafter employed to obtain a usable form of energy, as described in the methods section.

As described in FIGS. 3a–c, 4a–b, the mentioned above elements-45 can include a moveable parts-55 that blocks more particles that come from one direction-16 than particles from the opposite direction-17. For example as described in FIG. 3a, by using a tiny unidirectional gates-54, which include a moveable part-55, that will be installed on one side-51 of a permeable membrane-50, and facing to the same side-51 of this membrane-50, so they will selectively block more moving particles that come from the side they installed on-16, than moving particles that come from the other side-17.

The elements-45 can be created from body-50 itself or from parts-55 connected thereto. In any case they are defined herein as being connected to the body-50.

The mentioned above elements including said gates, or stoppers, or the body-50 itself, they connected to, can be manufactured from different kinds of materials, mainly from carbons, silicones. And as described in FIGS. 21–30 the gates-54 or the stoppers-12, preferably can be made of aromatic molecules that are based on Benzene, as PHENANTHRENE, CYCLOHEXANE, BENZENE, NAPHTHALENE, PHENALENE. Furthermore, As described in FIGS. 4a–b,21–24,27,29,30, for optimize their operation, the moveable part-55 of this elements-45 can be strengthened and stabilized, to the body-50 via linkers-155, 156,157, at its optimal position, for enabling the moveable part-55 to move by its own kinetic energy, and this linkers are made of chains of atoms, preferably of carbon.

Figure 19A:
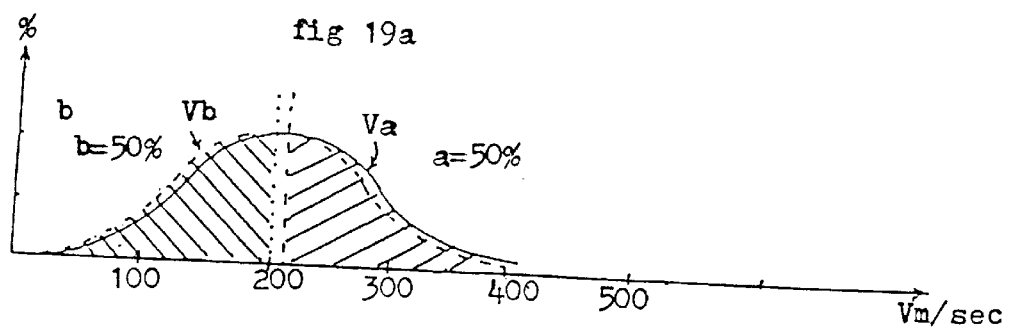
FIGS. 19a–b demonstrates the graph of the partition of the molecules by their velocity, including the moving particles and the gates/stoppers, according to the present invention.
Figure 19B:
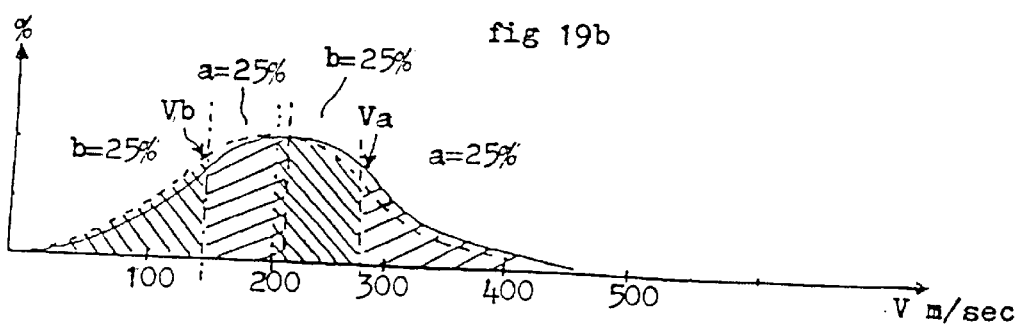
Figure 20:
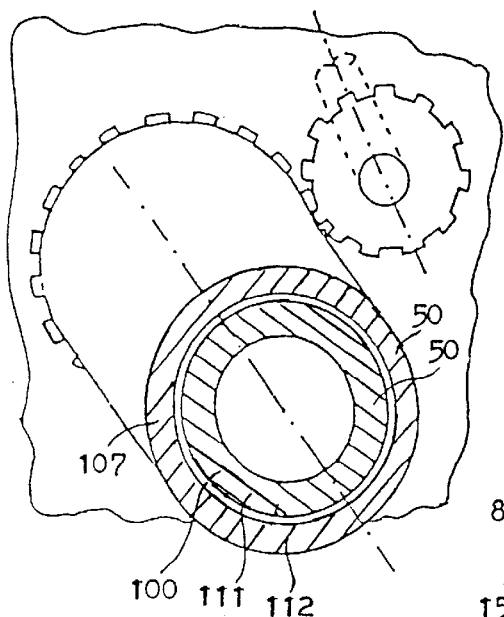
FIG. 20 is a three-dimensional view of a device which operates with a magnet or an electromagnet.
Figure 21:
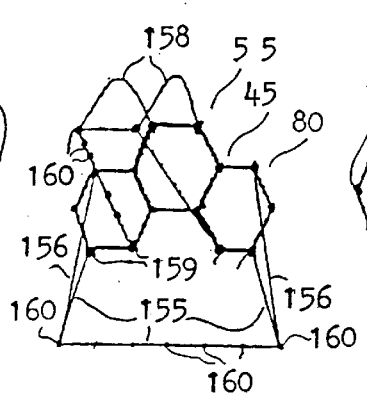
FIGS. 21 and 22 demonstrate gates and stoppers according to the present invention based on the PHENANTHRENE molecule stabilized onto a surface via molecule-chains.
Figure 22:
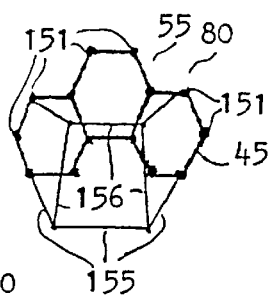
Figure 23:
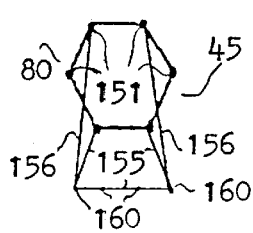
FIGS. 23 and 24 demonstrate gates and stoppers according to the present invention based on the CYCLOHEXANE and the BENZENE molecules, stabilized onto a surface via molecule-chains.
Figure 24:
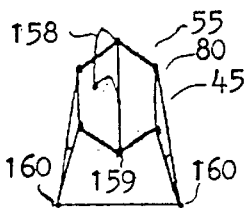
Figure 25:
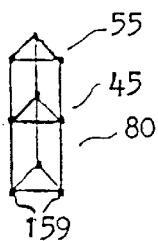
FIG. 25 demonstrates gates and stoppers based on the $=C_9H_3$ molecule as a triangle-prism.
Figure 26:
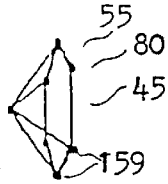
FIG. 26 demonstrates gates and stoppers based on the BENZENE molecule.
Figure 27:
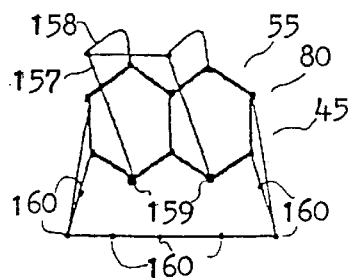
FIG. 27 demonstrates gates and stoppers based on the NAPHTHALENE molecule stabilized onto a surface via molecule-chains.
Figure 28:
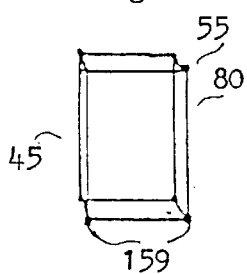
FIG. 28 demonstrates gates and stoppers based on a molecule with shape of a rectangular-prism.
Figure 29:
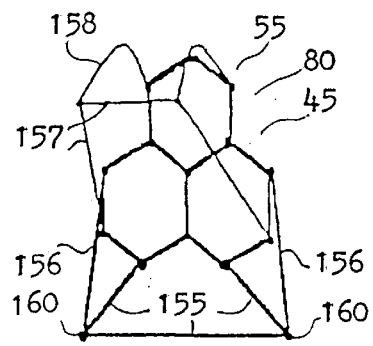
FIGS. 29 and 30 demonstrate gates and stoppers based on the PHENALENE molecule stabilized onto a surface via molecule-chains.
Figure 30:
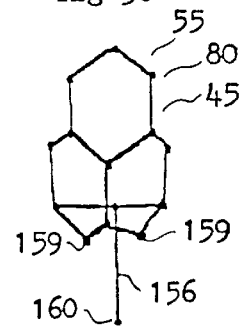

As one can deduce from the calculations made with respect to the mentioned gates operation system and from the graph of FIG. 19, for the best utilization of mechanism based on said elements (gates/stoppers) which include a moveable part, one should use particles having a molecular weight which is similar to the moveable parts weight of this elements (the elements mass can be between quarter of the particle mass till four times bigger than the particle mass).

Also as described for example in FIGS. 3d, 4c, this tiny elements-45 can be stationary, from different kinds, as described, for example in FIG. 3d, they can be as stationary gates-54, or as described in FIG. 4c, they can be stationary stoppers-12, as further described.

Tiny Unidirectional Gates

According to another embodiment of the present invention, As described for example in FIGS. 3a–d,6b–e, the mentioned above elements-45 can be a tiny unidirectional gates-54 which their smallest dimension (from the three dimensions x,y,z) can be from one single atom, till about 1 mm. This gates-54 are selectively blocking particles-15 of a fluid (as gas or liquid) by their direction, and this gates-54 can be with a moveable part-55(see FIGS. 3a–c,21–30), or stationary(see FIG. 3d).

As described for example in FIGS. 3a–d, this gates-54 can be installed on or inside a permeable membrane-50(also a permeable surface), and at least most of them are facing to the same side of the membrane-51, and block more moving particles-15 that are moving in one direction-16, than particles-15 that are moving in the opposite direction-17, and thereby they generate a flow of particles-15 through the membrane-50, and an equivalent vectorial force-$\Sigma Fx$ that operate on the membrane-50, and can generate a pressure difference across the membrane-50, which thereafter employed to obtain a usable form of energy, as described in the methods section.

The size of the mentioned above moveable part-55 of the gates-54 is mainly molecular size and preferably bigger than the membranes-50 holes, and preferably with a similar mass to the moving particles-15 mass (the moveable parts-55 mass is preferably between a quarter till four times of the particle mass).

More detailed, in one way, as described for example in FIG. 3a, if this gates-54 include a moveable part-55, they are covering one side-51 of a permeable membrane-50(also a permeable surface), which they attached to, and at least most of them are facing to the same side they attached-51, and are opening mainly to this side-51, so they selectively block more moving particles-15 that come from the side they attached to-51, than particles-15 that come from the opposite side of the membrane-52, and thereby they generate the mentioned above flow of particles, and the mentioned equivalent vectorial force-$\Sigma Fx$, and the mentioned pressure difference across the membrane-50.

In another more detailed way, as described in FIG. 3d, this gates-54 can be stationary, while in one form they can be build as holes in a surface-50 from one side to the other, while one opening of this hole is bigger than their other opening, and they are facing with their bigger opening to the same side of the surface-52, and they let more particles passing through the side of the bigger openings than from the other side of the surface, so as mentioned in the section deal with the method and the mechanism, they selectively block the moving particles by their direction and as mentioned at this section they supply energy. The maximum width of the large opening is about 0.2 mm. And the holes can be in various of shapes, for example as pyramids, or cones, or slits and etc., and their inside should be smooth. The mentioned above stationary gates-54 can be manufactured in the surface itself-50, by using drills, or by tools with a very sharpened edges as very sharp pins, to punch the holes in the surface(for example by using a steel brash with very sharp edges), and it is preferred to worm the mentioned sharpened tools before punching the surface, also it preferably to flow a warm fluid as gas or liquid through this holes to smooth their internal side.

Gates 54 can be created from body 50 itself or from parts 55 connected thereto. In any case they are defined herein as being attached to the body. Gates 54 are installed in or on body 50, so that most or all of gates 54 are openable in only one general direction.

FIGS. 6a–e demonstrate the principle of operation of this embodiment of the present invention.

Assume we have a box 35 which contains gas particles-15 (for example of Xenon) and is characterized by a given internal pressure (e.g., 1 atmosphere), as shown in FIG. 6a. And as we know the diameter of that gas atoms is about 3 angstroms, and the distance between that atoms is about 35 angstroms, ad their velocity is about 200 m/sec, and each particle is clash other atoms for about $1*10^7$ in a second. But 95% of the time they are not clash between themselves.

As shown in FIG. 6b, further assume that box-35 divided by a permeable partition,60, (as a membrane) into two sub compartments, 62- A and B. The partition 50 is permeable to moving gas particles-15, and has a pressure resistant.

Further assume, as shown in FIG. 6b, that partition 50 is covered on one side thereof with molecular gates-54. Gates-54 are selected to match in size to gas particles-15. And they caveres all the holes that at the surface side of the membrane-50 they attached to. Gates-54 open only to the side on which they are present. The diameter of the holes in the partition is about 4–5 angestram. So about 95% of the time no moving particle clash at each gate. And so this gates will let pass through of particles from subcompartment B to subcompartment A, but they will block of passing through of particles from subcompartment A to subcompartment B. So as shown in FIG. 6c, as a result will be accumulate of gas particles-15 in sub compartment A , generating elevated pressure therein, whereas sub pressure is formed in the other subcompartment B. As shown in FIG. 6d, the difference in pressure may be used to released through a turbine 70 and thereby, e.g., using a generator 72. Also as described in FIGS. 6d,6e we can say that the difference of particles blocked by the partition in one direction to particles that blocked in the opposite direction, creates a general flow in only one direction, so that kinetic energy of the gas particles may be converted into a usable form of energy.

As shown in FIG. 6e, this process may be cycled to provide a continuous supply of usable power, and using a heat exchanger-133 which return back the heat energy to the gas particles when they passing through the turbine.

Force, energy profits, efficiency and capacity calculation concerning the operation of the configuration presented in FIGS. 6a–e are given in the calculations sheets.

In another application of the mentioned gates, we can use the mentioned membranes-50 with said gates-54, to move a piston.

Tiny Unidirectional Stoppers

The said elements can be also a tiny unidirectional stopper, that their smallest dimension (from the three dimensions x,y,z) can be from one single atom, till 1 mm, as described for example in FIG. 4. This tiny unidirectional stoppers, 12, are selectively blocks more particles moving in one general direction than particles that move in the opposite general direction, and this tiny unidirectional stoppers are installed on or in a body (also a surface)-50, see FIG. 4c, and at least most of them are facing to the same direction, so they cause a general flow of particles because of their operation, so this unidirectional stoppers can be used for energy conversion.

Stoppers 12 may be of different kinds. As described in FIGS. 4a–b the stoppers can be movable. As described in FIGS. 4a–b,21–24,27,29,30, the stoppers can be strengthened and stabilized to the body-50 via linkers, 155,156,157, made of chains of atoms, that enable the stoppers-12 to lie close to the surface in one direction, and prevent from the stoppers to lie in the other direction, so they can selectively block more particles-15 that come from one direction-16 than particles-15 that come from the opposite direction-17. If the stoppers are moveable their size is preferably molecular size, and preferably with a similar weight to the moving particles (the stopper mass is preferably between a quarter till four times of the particles mass).

The stoppers also may be stationary as described in FIG. 4c. Stoppers 12 may be integrally formed with or connected to surface-50. Stoppers 12 are designed to better restrict the movement of particles arriving from one direction as compared with particles arriving from the opposite direction, such that a force acting on body-50 is generated.

FIG. 36 presents a configuration of a device constructed and operated according to the above explanation. Device-20 includes a disk-100, which covered with said stoppers-12, and there should be a stationary blocking muzzles-111, on another body-107, which prevent free movement of the moving particles to the opposite direction, and this device-20 may convert kinetic energy of fluid particles into a rotation.

Figure 16A:
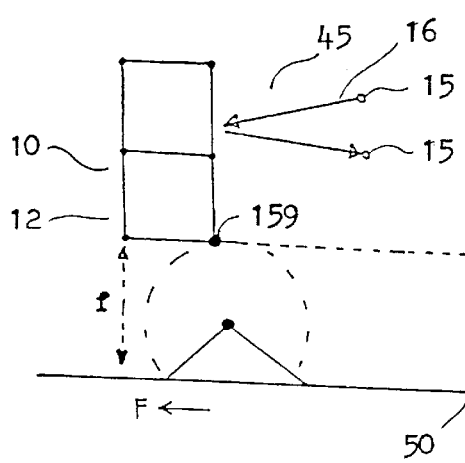
FIGS. 16a–b are schematic depictions demonstrating the stopper molecule according to the present invention.
Figure 16B:
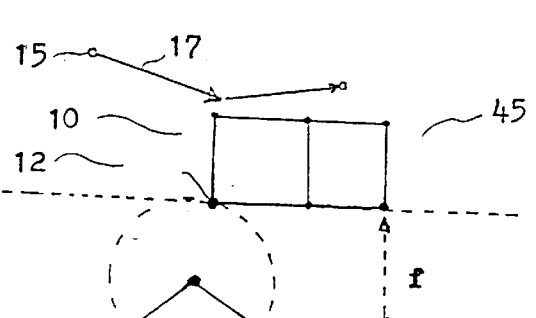
Figure 17A:
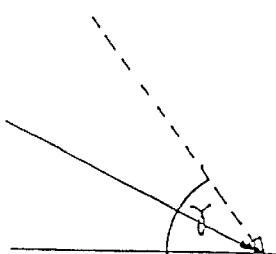
FIGS. 17a–b demonstrates the average effective collision angle.
Figure 17B:
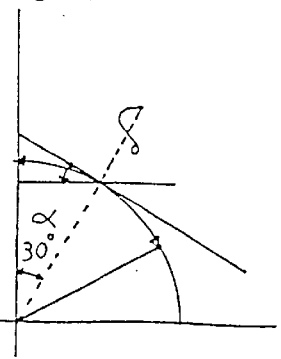
Figure 18:
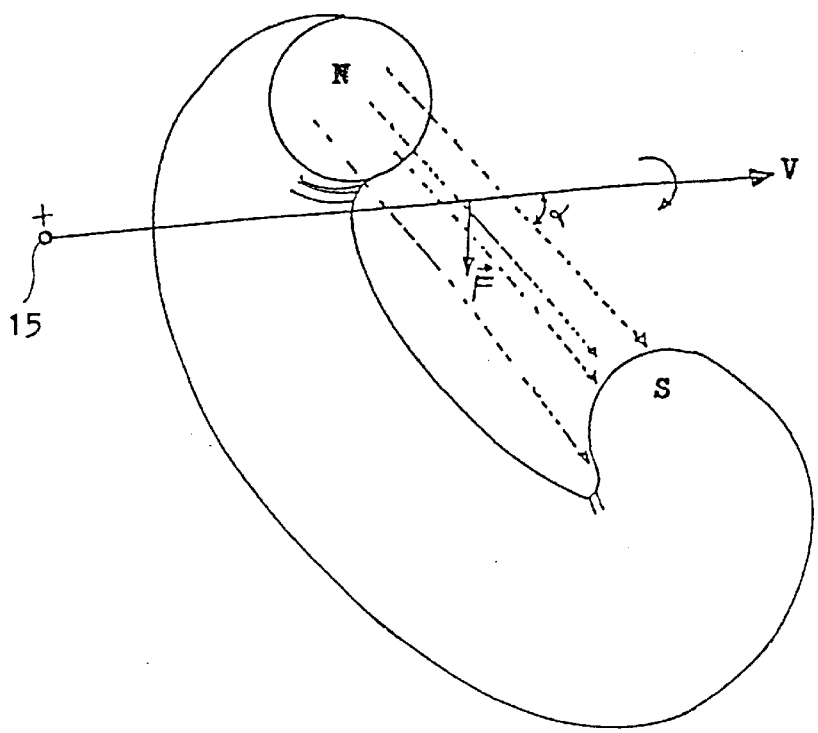
FIG. 18 demonstrates the forces which operate on the ion in a magnetic field.

This phenomenon is further demonstrated in FIGS. 16a–b. Force, energy profits, efficiency and capacity calculations concerning the operation of the configuration presented in FIG. 4 are similar to those concerning the above-described gates, without the resistant of the membrane itself to the passage therethrough of the moving particles.

Processes for Install Gates on a Surface

The following some of the processes that can be used for covers a permeable surface as a permeable membrane and the like, with gates on one side thereof. The membrane itself should be from a strong substance with a 3D firm structure of its molecules. The membrane should be strengthened with a crowded(not full) strong net. And the said membrane will be permeable to the moving particles that will be used in the designated device, but it will not be permeable to the said gates.

Process 1:

(a) Covering the surface with halogen (e.g., Cl, Br, I) atoms, by, for example contacting the surface with the halogen atoms(the halogens can become as a gas or in a solution). Alternatively, the gates themselves (at least their bases) may be covered with halogen atoms, instead the mentioned surface.

(b) Preparing a solution of the gates in an appropriate solvent such as alcohol or the like, and adding alkali such as KOH or NaOH, to this solution.

(c) Contacting the mentioned above solution only with only one side of the surface, thereby chemically attaching the gates to the surface.

(d) Washing the surface from the remaining halogen atoms and other substances with alcohol or the like.

Process 2: An Alternative Process may also be Employed (a) Covering some(not all) of the surface atoms with halogens (e.g., Cl, Br, I) atoms, by, for example contacting the surface with a solution of Halogens in an appropriate solvent such as alcohol, and adding alkali such as KOH or NaOH, to this solution, such that the atoms in the surface that will be connected with the Halogens, will not be to much close one to the other, and this we achieve by:

1) limiting the time of contact the solution with the surface, or 2) limiting the amount of the Halogen. The gates are also have to be partly covered (not covered all the atoms of the gates) with Halogen atoms [at least their bases-159(see FIGS. 10a–c,21–30)], by, for example contacting the gates substance with a solution of halogen atoms in an appropriate solvent such as alcohol, and adding alkali such as KOH or NaOH, to this solution.

(b) Preparing a thin solution of the gates in an appropriate solvent such as alcohol or the like, and adding a metal ions such as Mg/Na/K to this solution.

(c) Contacting the mentioned above solution with only one side of the surface, thereby chemically attaching the gates to the surface.

(d) Washing the surface from the remaining halogen atoms and other substances with solution of alcohol with KOH/NaOH and afterwards with water or the like.

Process 3: An alternative process may also be employed as process 2, when in paragraph (b) there will not be added metal ions to the gates solution, and instead of this, the chosen side of the surface will be covered with only Magnesium atoms for creating a 'Griniar component', and afterwards (in the same paragraph), it will washed out with alcohol or the like.

Process 4: A detailed alternative process for install the gates on a permeable surface, such as a permeable membrane and the like, may also be employed. The gate molecules which are preferably will be made of Benzene derivatives, as described for example in FIGS. 21–30.

(a) Prepare a solution containing about 5% chlorine dissolved in about 400 ml of C-$Cl_4$ or C2–C6. Add about 4 grams of chloro-aluminum powder ($AlCl_3$), and mix. Then, apply the mixture to the membrane surface, itself based on Polystyrene, or the like, for about 30 minutes. Thereafter, the membrane is washed, with ether for example.

(b) Mix about 5 grams of magnesium powder with a diluted solution of about 10 ml of the gates (as described) in about 500 ml of ether of the like (not water). The gates include base atoms-159, as shown in FIGS. 21–30, and further include strengthening and stabilizing chains-155, 156,157,158 hanging therefrom. Chlorine atoms are provided conjugated to some of the base atoms-159 and to the base chain atoms-160. The distance between chlorinated base atoms should exceed 2.5 Angstrom. In a non-water environment this mixture has to remain for about 30 minutes to achieve a Griniar reaction (R—Mg—Cl).

(c) Immerse the membrane in ether or the like(not water), and add the solution of the above-mentioned gates mixture in a thin layer to only one side of the membrane for about an hour ensuring no contact of the mentioned solution with the other side of the membrane.

(d) Get out the membrane and wash it with ether. Immerse the membrane in solution of alcohol with KOH/NaOH for about half hour. Wash the membrane with refined water. Dry the membrane in a dry flow of very clean air.

Process 5: Alternatively to process (3), at the end of section (a) one can add a solution of about 4 gr of Magnesium powder, in about 200 ml of Ether, for about half hour, and Wash the membrane in Ether. And section (b) will be executed when there will be no added of Magnesium powder to the gates solution.

In general one can use Br instead of Cl and further use different temperature and illumination to assist the above-mentioned processes. At the end of the processes one can covering the surface and the gates with fluorine atoms, by, for example contacting of the surface with the fluorine atoms(as gas or a solution).

Process 6: Alternatively to process 3, one can use Na/K (for Virts process) instead of Mg, and sections (b) and (c) will be united.

Another possibility to attach the membrane the gates can be done in a system as described for example in FIGS. 6d–e, when the attach of the gates to the membrane will be not permanently, and there will be a filter at the connecting point,67, of the pipe that goes to the turbine,70, to keep the gates remaining at the same side of the membrane. The gates can be attached to the membrane comprising one of the following or the like.

1) Attach a magnet/electromagnet to the side of the membrane that not covered by the gates, or place that magnet at that side of the membrane, alternatively the membrane itself will be magnetic. The gates has to be containing ferromagnetic substance or be magnetic.

2) The membrane surface will be covered with strong polarity substance like fluorine. The gates themselves will contain at least at one of their edges a polarity substance as fluorine or the like.

Figure 38:
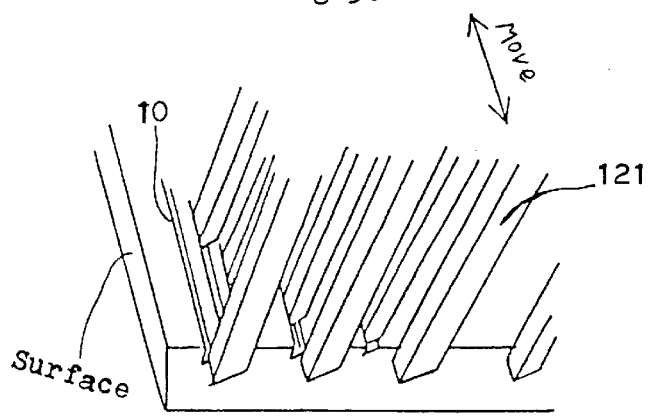
FIG. 38 demonstrates the action of a brush for manufacturing the stoppers according to the present invention.

One can also manufacture the gates from the permeable surface itself, by using means to roughen or engraving one side thereof with a file, or a sandpaper, or a surface plated with diamond dust, or a brush as described in FIG. 38, with a very sharp edges, 121, which made of very hard substance like steel, or a delicate engraving tool as a narrow laser beam or an engraving knife, etc. Thereafter the mentioned plated surface with the sharp protrusions or the engraving tool, will be moved with little pressure applied, a great number of times against the permeable surface. The number of times is related to the density of protrusions per 1 mm. The preferred calculation is: $y=400,000/(n*x)$ n—is the number of protrusions/sharp edges per 1 mm^2.

x—is the width of the plated surface with the sharp protrusions/sharp edges.

A similar result may be obtained by sand blasting or diamond dust blasting the surface. Chemicals can be used to refine and delicate the gates. Preferably while modifying the gates as described heat is applied to ease and improve the operation.

Processes for Install Stoppers on a Surface.

To the process of connecting the stoppers to the surface one may use the same processes as used to connecting the gates to the surface with the next changes and additions:

1) The body/surface does not have to be penetrable at all.

2) One of the edges of each of the stoppers is provided with a substance, x, which permits the application of a vectorial force onto the stopper, during this process. One example for substance x is a Fluor atom which creates strong polarity and can be maneuvered under an electrical field. Substance x is removed after the attachment process is completed 3) The connecting processes will be executed during using of some vectorial force, that can be also a chemi force or outsided force (for example gravity).

4) The process of connecting the stoppers to the body(also a surface) recommended to execute by two main stages:

a) The stoppers will be connecting with one chosen atom, that is on their base or on their base chains, to the surface, through the chemically processes as detailed before, without acting any force on them.

b) repeat of all the connecting process, during operate some vectorial force on the stoppers.

A detailed process for install the stoppers on a body such as a surface, may also be employed. The stoppers molecules are preferably will be made of Benzene derivatives, as described for example in FIGS. 21–30. The stoppers include base atoms, c, as shown in FIGS. 21–30, and further includes strengthening and stabilizing chains hanging therefrom. Chlorine atoms is provided conjugated to one of the base atoms and to one of the chains atoms. One of the edges of each of the stoppers is provided with a substance, x, as said before, for example the substance x can be a Fluor atom.

(a) Prepare a solution containing about 5% chlorine dissolved in about 200 ml of C-$Cl_4$ or C2–Cl6. Add about 4 grams of chloro-aluminum powder ($AlCl_3$), and mix. Then, apply the mixture to the surface, itself preferable based on Polystyrene, or the like, and its size is about 20 cm/20 cm (related to the amount of the mixture), this solution remain for about 30 minutes. Thereafter wash the surface for example with ether.

(b) Mix about 5 grams of magnesium powder with a diluted solution of about 5 ml of the stoppers (as described) in about 500 ml of ether or the like (not water). In a non-water environment this mixture has to remain for about 30 minutes to achieve a Griniar reaction (R—Mg—Cl).

(c) Add the solution of the above-mentioned stoppers mixture in a thin layer to the surface for about an hour. And afterwards wash the surface with ether.

(d) Prepare a solution containing about 5% chlorine dissolved in 200 ml of C-Cl$_4$ or C2–Cl6. Add about 4 grams of chloro-aluminum powder (AlCl$_3$), and mix. Then, apply the mixture to the surface, this solution remains for about 10 minutes. Thereafter, the surface is washed with, for example, ether.

(e) Mix 5 grams of magnesium powder in about 500 ml of ether or the like (not water). In a non-water environment. Add this solution the surface, during activated the mentioned vectorial force that is appropriate to the x substance, and this force will remain all the time process for about 60 minutes. Thereafter, the surface is washed with, for example, ether.

(f) Immerse the membrane in solution of alcohol with KOH/NaOH for about half hour. Wash the membrane with refined water. Dry the membrane in a dry flow of very clean air.

In general one can use Br instead of Cl and further use different temperatures and illumination to assist the above-mentioned processes.

Alternatively if using Na/K (for Virts process) instead of Mg, sections (b) and (c) will be united.

The vectorial forces and the appropriate x substances are listed here in below:

1. Electrical force—using a very strong electrical field, the substances x is as Fluor the like.
2. Friction force—by flowing the solution in some velocity at the desirable direction on the surface, the substance x is a heavy atom element, such as lead.
3. Friction force—by flowing the solution in some velocity at the desirable direction on the surface. The substance x features attract polarity to the solution, and is preferably heavy, like chlorine, bromide cesium or lead.
4. Centrifugal force—by putting the surface at the desired direction in a centrifuge and operate the centrifuge. The substance is a heavy atom element, such as Lead or Iodine etc.
5. Magnetic force—using a very strong magnetic field. The substance x is a Ferro-magnetic substance like Iron or with some magnetic polarity as tiny magnets.
6. Chemical force—using a surface with atoms arrange in some direction (as like as crystal), so that the stoppers can be connected to the surface in only one direction.

One can execute the all above mentioned processes in different kind of temperatures.

Also one can use a combination of the mentioned above force.

The stopper molecules may be polymerized before the above-mentioned process. Thereafter, they can be disconnected as necessary.

In another embodiment an extension exists between the x substance and the stopper's edge.

Figure 39:
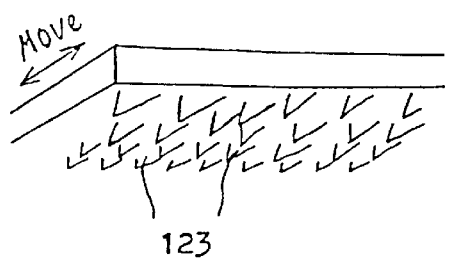
FIG. 39 demonstrates the action of a teeth for manufacturing the stoppers according to the present invention.

One can also manufacturer the stoppers from the surface itself by using the means to roughen or engraving the surface, exactly with the same means that use to manufacture the gates as maintained before from the surface, just that in the case of manufacture the stoppers there no need of a membrane or any other permeable body, and at all the processes to roughen or engraving the stoppers from the surface itself, the edges of the engraving tools will be made of very hard substances like steel, and the edges will be positioned in a sharp angle with respect to the treated surface(recommended less than 60°), and this tools as described in FIGS. 38,39, will be moved with a little pressure against the surface when the edges will be in always at the same direction relatively to the surface. As described in FIG. 38, The mentioned above tool can be a brush with very sharp edges,121, and will be used as mentioned above. Also As described in FIG. 3, we can use a surface plated with very sharp teeth, 123, that are made of a very hard substance like steel, and will be used as mentioned above.

The stoppers as described can be heat is applied to ease and improve the operation.

One can also manufacture the stoppers from the surface itself, by using exactly the same means that use to manufacture the gates as maintained before from the surface, just that in the case of manufacture the stoppers, the body does not have to be permeable to the particles, and after finished roughen or engraving the surface, one has to do one or more of the followings:

(a) Blow a liquid/gas on the surface, at one direction perpendicular to the above. The liquid/gas is preferably warmed to about 160° c. Should nylon be of choice, temperature may even be 200° c., such that the surface and blockers become workable.

(b) Alternatively to (a) use a mild solvent instead of warm gas/liquid to turn the surface and the blockers(stoppers) workable.

(c) Alternatively to (a) use a sponge saturated with warm liquid at the above-mentioned temperatures and move it to the same direction.

(d) One side of each of the stoppers may be chemically modified as desired using a suitable light sensitive chemical reaction conjugated to a single sided illumination with appropriate light from appropriate angle.

At all the methods of connecting the gates/stoppers to one side of the surface or to manufacture them from the surface (also a body) itself, one can smooth the second side of the surface even before the mentioned above process, and also the second side can be plated with fluorine.

Calculations of the Efficiency and the Power of Membranes with Gates

--- data:

the moving particle - a - C2F6 - molecular weight = 138;
the gate - b - C12H4 - molecular weight = 148;
P = 1 atmosphere; T = 273° k.

---

As demonstrated in FIG. 13, when the moving particle come from side A, and collide the gate, it can't passing through the gate and the membranes face, no matter if the gate is get open, or get close.

But when the moving particle come from side B, and collide the gate, when the gate is get open (about ¼ of the time), it is can passing through the gate and the membranes face, because they have the same mass and the same linear velocity, and since we take in a count only particles that have the same velocity as the gates and particles which their velocity is not higher by 25% more then the velocity of the gates, so in our calculation the average of the particles that are passing through the gates from side B to side A is remain as average velocity.

Since the velocities of the gate and of the moving particle are not constant, we have to calculate the percent of the number of times that the particle and the gate are moving in a close velocity as required (see FIG. 19).

$$x\% = [(50+2.5)*(50+2.5)+(25+2.5)*(25+2.5)*(25+2.5)*(25+2.5)]/100\ x\ \% = 42.7\%$$

In FIG. 11, the opening segment of the gate is δ(Delta), while the used segment in the gate motion from its movement is α (Alfa) (¼ of the time for one circulation of closing and opening of the gate). The effective clashing segment direction of a moving particle at a gate is γ (gamma). When the gate is wide opening (¼ of the time for one circulation of the gate motion) the particles can move in both directions with no interference, and that we take in the later calculations.

η—the efficiency of a gate while clashed by a moving particle.

$\eta = (¼ * x \% /100 * gamma/180) = 0.035$

As assumption is made to simplify the calculations—the gate and the particle are moving perpendicular to the surface.

In Work State (FIGS. 6d–e)

the membrane,60, covered on one side of it with the unidirectional gates,64, is divide a close container, into two separated sub-compartments, and this two sub-compartments are connected between themselves with a turbine,70, and a heat-exchange and a connecting pipe, that connect between all of this parts and all of this when there is given that: when the number of the activated gates is 20% from the all membrane surface, and the other gates that covered the membrane are not activated and sealed to the passing through of particles:

S—the all surface area of the membrane is 2500 cm^2

S1—the area of the active gates, which is 20% of the membrane area dX1—the amount of the gas that passing through the gates as result of their operation.

myu—the permeability of the membrane itself, with no connection to the gates or to the membrane surface, and is 0.05.

myu1—the permeability of the gates in both directions to the particles when they are wide open.

estimate—myu1 is 0.3, so only 0.3 of the particles can pass the gates when the gates are wide open.

Va—the average velocity of the moving particles

V—the statistical velocity of all the particles in the system related to the membrane.

V1—the statistical velocity of all the particles through the membranes surface (not through the all membrane thickness), as the result of the gates operation, with no connection to the membranes thickness $V1 = Va * n * myu1 * S1/S = 221 * 0.035 * 0.3 * 0.2 = 0.464$ m/sec $dX1 = S * V1 = 0.25 * 0.464 = 0.116$ m^2/sec As the result of the gates operation of the gas particles that going through them, there created a pressure differences between the two sides of membrane surface.

The gates, as result of their self movement, are widely open about quarter of the time, and at that time gas particles can pass through freely in the both directions, and the difference of pressure that will be created on the membrane surface, will cause to the return back of some of the gas particles from the high pressure to the low pressure through the gates in segment δ, in FIG. 11, at that quarter of time, so the final pressure difference will be lower than the maximum.

dt—the time in which the gates are wide open

S2—the effective area of the gates depending the time in which some of the particles are going back because of the pressure difference $S2 = dt * δ/180 * S1 = 0.25 * 0.3 * 0.2 * 0.25 = 3.75 * 10^{-3}$ m^2

Vrev1—the velocity of the particles that return back through the membrane, because of the pressure difference dP1—the final pressures difference on the membrane surface (at zero distance from the membranes surface), at the pressures balance point, that created as result of the gates operation, and the reversed particles, and the general gas flow through the turbine and the heat-exchanger and back to the membrane, see FIG. 6d.

$Vrev1 = Va * (dP1 (at')/1at') * myu1 * S2/S$ $Vrev1 = 221 * (dP1 (at')/1at') * 0.3 * 0.00375/0.25$ $Vrev1 = 0.9945$ (m/sec) $* (dP1 (at')/1at')$ dX2—the amount of gas that return back through the gates at the time they are wide open, with no connection to the membrane thickness.

$dX2 = S * Vrev1$ $dX2 (cm^3/sec) = 0.25 * 0.9945 * (dP1 (at')/1at')$ $dX2 (m^3/sec) = 0.2486 * (dP1 (at')/1at')$ dX4—the amount of gas that makes passing through the turbine, the heat exchanger, and back through the membrane (FIG. 6e).

Practically the lowest permeability in the system, is determine the gas general flow velocity.

The heat-exchanger in practice has no resistance to the gas flow.

Since we use some of the kinetic energy of the gas through the turbine, so its internal energy and it heat decrease too. The turbine permeability to the gas flow in practice can be between 0.7 to 0.98 according the needs. Here we determine that the turbine permeability is myu4=0.9.

V4—the velocity of the gas flow through the turbine (m/sec).

S4—the area of the turbine through it the gas is flow. If we assume that the diameter of the turbine is 30 cm, than its area is 0.0707 m^2.

dX4—the gas volume that passing through the turbine is second.

$V4 = Va * (dP4(at')/1at') * myu4 = 221 * (dP4(at')/1at') * 0.9$ $V4 = 198.9 * (dP4(at')/1at')$ $dX4 = S4 * V4 = 0.0707 * 198.9 * (dP4(at') = 14.062 * (dP4(at')/1at')$ dX3—the gas volume that passing through the all membranes in a second, V3—the gas velocity through the all membrane.

S3—the membrane surface, equal to 0.25 m^2.

$dX3 = dX4$ $V3 = V = dX3/S$ $V3 = Va * (dP3(at')/1at') * myu = 221 * (dP3)(at')/1at') * 0.05$ $V3 = 11.05 * (dP3(at')/1at')$ $dX3 = V3 * S = 11.05 * (dP3(at')1at') * 0.25 = 2.7625 * (dP3 (at')/1at')$ 1) $dX3 = dX4 = dX1 - dX2 = 0.116 - 0.2486 * (dP1 (at')/1at')$
2) $dX3 = dX4 = 2.7625 * (dP3(at')/1at')$
3) $dX3 = dX4 = S4 * V4 = 14.062 * (dP4(at')/1at')$
4) $dP1 = |dP3| + |dP4|$ 4) in 1) $dX3 = dX4 = 0.116 - 0.2486 * (dP3(at')/1at') - 0.2486 * (dP4(at')/1at')$ 2) in 3) $2.7625 * (dP3(at')/1at') = 14.062 * (dP4(at')1at')$
$dP3 = 5.09 * (dP4(at')/1at')$ 2) in 1) $2.7625 * (dP3(at')/1at') = 0.116 - 0.2486 * (dP3(at')/1at') - 0.2486 * (dP4(at')/1at')$ $(dP3(at')/1at') * 3.011 =$ 0.116−0.2486* (dP4(at')/1at') 5.09* (dP4(at')/1at') *3.011=0.116−0.2486* (dP4(at')/1at') 15.5746* (dP4(at')/1at')=0.116 dP4(at')=0.00745 at' dP3(at')32 5.09*0.00745=0.0379 at'

2) dX3=dX4=2.7625*0.0379=0.1047 m^3

V4=dX4/S4=0.1047/0.0707=1.481 m/sec

F4=dP4*S4=0.00745 at' *707 cm^2=5.267 kg=52.67 nt

P=(F*S)/t-32 F4*V4=52.67*1.481=394 w

For Conclusion

If we will put in the container 20 membranes that will be operate in parallel, so the area of the membrane will increase 20 times and will be 5 m^2, and be build as spiral or the like for space save, when the total pressure difference will remain the same, and the power that we will get from the system will be increased 20 times to P2=7,880 w.

Magnets and Ions

According to a fourth embodiment of the present invention, as shown in FIG. 5, for example, the device can comprising a magnet 90 (e.g., at least one magnet and/or electromagnet) that may be used to create a magnetic field to further assist in separating (selectively diverting) moving ions according to their direction, and block the pulled ions by muzzles(meaning also a rough surface) 106 attached to a body 100. The magnet 90 will reject ions which come from the opposite direction so they will not be blocked by the said muzzles 106 from their other side, this rejected ions can be blocked by other muzzles 108 that can be placed on another body,107, that covers as a casing the first body,100. The difference in the number of moving ions, which are blocked by muzzles 106 from one side, compared with the other side, will create a vectorial force which will operate on the muzzles 106 and will bring about a rotational movement around an axis 102. With the casing body,108, we: (a) prevent a free circulation movements of the rejected ions that can't be use (b) with the muzzles,108, on it, we prevent a free motion of ions around the first body,100, and returning back this ions to the desired direction,111, so it complete the work of the first body,100.

As shown in FIGS. 32,34, there we use two bodies. One body 100 shaped as a cylinder rotating on an axis 102. The body 100 includes a magnet 90 (also an electromagnet) having magnetic poles, 104, N and S, and present on the cylinder 100. A casing 107 is also provided and should be covered with muzzles too. At least one of the bodies involved, i.e., the cylinder or casing is equipped with muzzles 106,108 such that operating magnet 90 will bring about a mechanical movement, or a flow of ions.

Also as shown in FIGS. 31,33, there we use two bodies. One body 100 shaped as a cylinder and should be covered with muzzles. A casing 107 is also provided and should be covered with muzzles too, and includes a magnet 90 (also an electromagnet) having magnetic poles N and S, and present on the implemented therein. At least one of the bodies involved, i.e., the cylinder or casing is equipped with muzzles 106,108 such that operating magnet 90 will bring about a mechanical movement, or a flow of ions.

The mentioned above muzzles can be in different kinds of shapes, for example like: projections, rough surface, teeth, grooves, etc.

An ion generator may be provided with the device to replenish the ions.

Energy Calculations for a Device Based on Magnets and Ions

According to FIGS. 5, 18, and 31–34:

A magnetic field influences a linearly moving charged particle (ion) to bend its course of movement along a circle having a radius R (FIG. 5):

R'>R=½ R'

R'—Radius of the device=10 cm

R=½* 0.1=0.05 m

If for example we will use nitrogen ions, than:

m=4.69*10^{−26} kg

B—The magnetic field

R=(m*V)/(q*B)

B=m*V/q*R=(4.69*10^{−26}*400)/(1.6*10^{−19}*0.05)

B=1.2956*10^{−3} (Wb/m^2)

The magnetic field can pull moving particles and block them using muzzles, to utilize their kinetic energy to move the body to which the muzzles are attached.

n—the fraction of kinetic energy utilized.

Since there are no seems loses, n=1.

Pressure=1(at)*n=1(at)*1=1 kg/cm^2

Assume that the effective area of the muzzles is S1=20,000 cm^2

F—the force which operate on the device.

F—the force which operate on the device.

V—the statistical velocity of all the particles from the surface during it's working, which is also the maximum velocity of the surface, if it has stationary muzzles, 108, FIGS. 31,33, which prevent free movement of the moving particles to the opposite direction.

F=S1*Pressure=2000*1=2000 kgr=20,000 Newton

V=Va*n=400*1=400 m/sec

P—the capacity which we get from the device.

P=(F*S)/t=F*V=20000*400=8*10^6 w=10666.6 Hp

Thus, one can obtain maximum 10,666.6 Hp from a small device. And this power for small devices one can get from the sea or rivers, there is water without limitation, wherein concentrated about 300 kcal to 1 liter of water, and to the water one can be added a resistant freezing liquids like alcohol.

Additions and Expansions

Herein were been described some examples for the execution of the idea of converting ambient heat into a usable form of energy, employing the kinetic energy of particles in fluids such as gases or liquids. The devices described herein may translate the kinetic energy of such particles into a mechanical energy, either linear or rotational movement.

Additions for the Device

A moveable device-20 which operates according to the given examples (especially if it based on said unidirectional stoppers or on said magnet and ions) as described in FIGS. 5,20,31–34,36, may include one or more parts-100,107 (bodies) which may move one relative to the other, and at least one part-100,107 should be connected to the mechanism-10, that cause the selectively blocking the particles by there direction, and thereby exploit the kinetic energy of fluid particles-15. If the device-20 is moveable, it preferably include two bodies-100,107, i.e., a first body-100 and a second body-107, the bodies may perform complementary actions. In other words, if the first body-100 is mobile, then the second body-107 will be stationary, or alternatively the second body-107 will move to the opposite direction of the first body. Each of said bodies-100,107 can carry muzzles-106,108,111.

All the mentioned before muzzles-106,108,111 can be in different shapes like: rough surface, projections and grooves especially vertically to the movement of the body, and the like.

The fluid particles should be chemically inert to the device and it's components in contact with the particles.

Additions for the System

As described in FIGS. 6e,7a,7b,35,37, the system-30 with all kinds of mechanisms can be a closed system, wherein ambient heat is absorbed by the particles(gas or liquid) through the system's walls-35. And also this system can be sealed, for enable increasing it's internal pressure(if the particles are as gas, not as liquid) for increase the power. Also as described for example in FIGS. 7a,7b,9, the system-30 can comprising a generator-72, which to it there is connected an electric cable-77 that is getting out of the system-30, for preventing any pressure looses. Also as described in FIG. 9, the system-30 can contain a gas-cylinder-79, for continuous supply of gas-15, for covering of any gas-15 loses from the system.

Figure 7A:
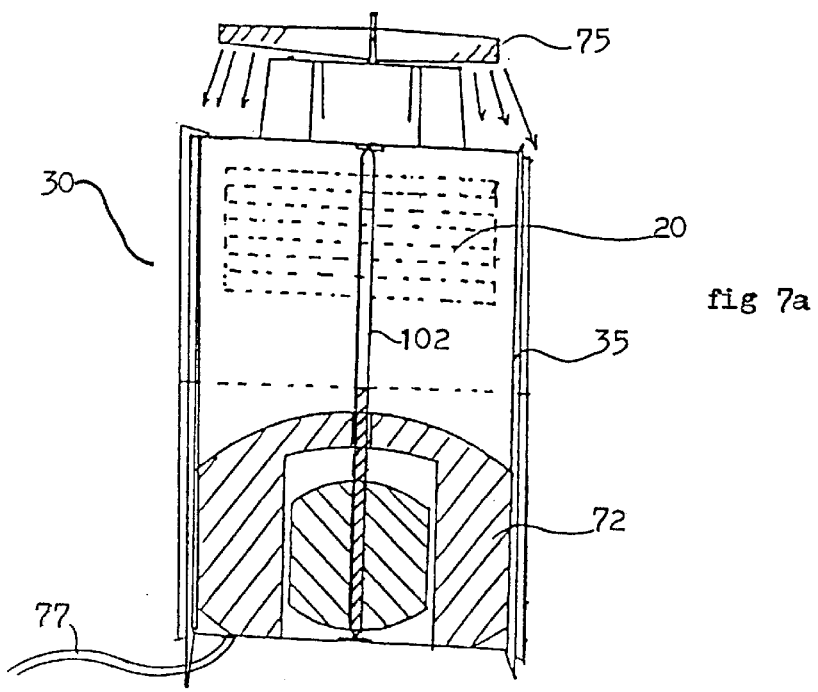
FIGS. 7a–b is a cross sectional view of a closed system heated by a fluid flowing across it's external surface, provided with an electricity generator.
Figure 7B:
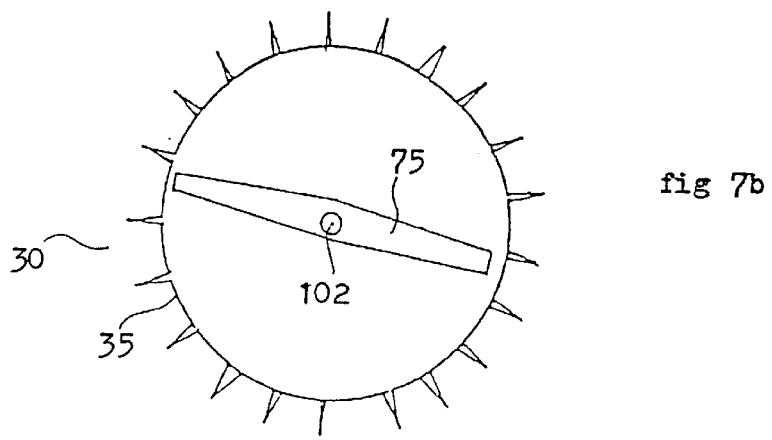
Figure 35:
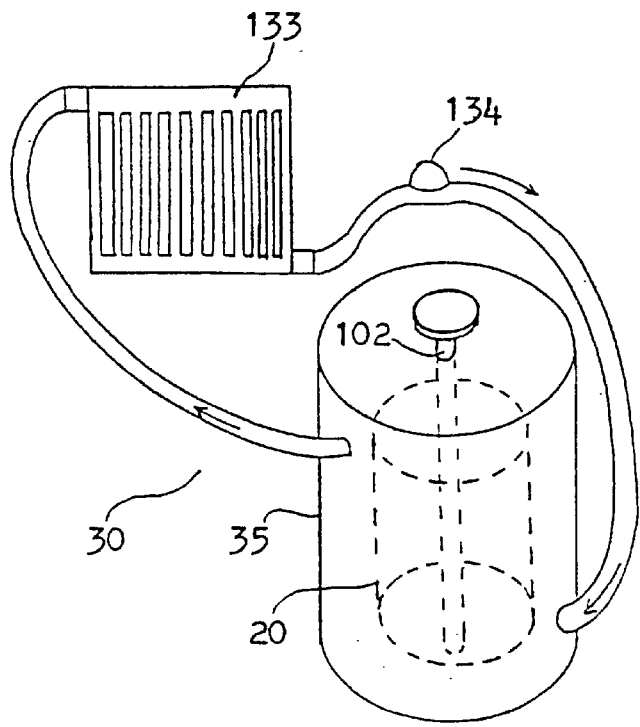
FIG. 35 is a three dimensional view of a system including a rotational device and a heat exchange implement according to the present invention.
Figure 37:
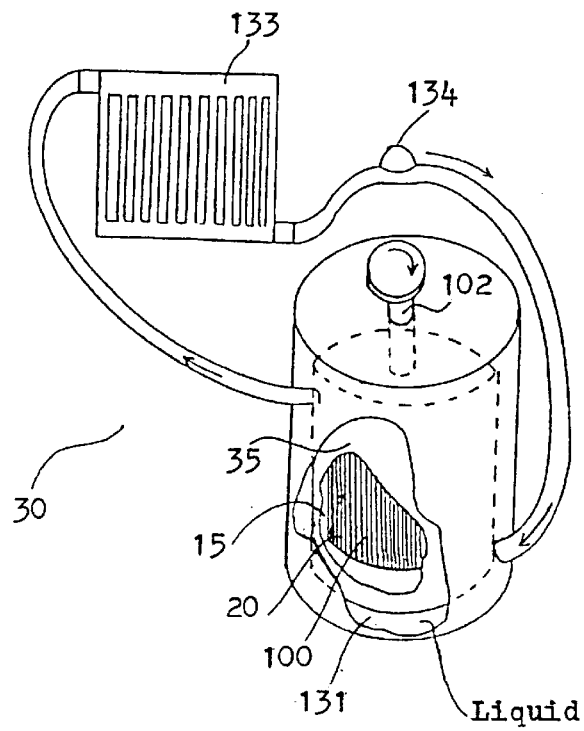
FIG. 37 is a three dimensional view of a device including a heat exchange implement according to the present invention.

As shown for example in FIGS. 6e,35,37 the system can use a heat-exchanger-133 preferably with a bellows to increase its efficiency and the power that we get from the system-30, and as shown for example in FIGS. 35,37 the system can use a pump-134 to pump the particles-15 from the device-20 to the heat exchancher and returning back to the device-20 in a circulation. As shown in FIG. 7a,7b, the system-30 may include a ventilator-75, or a blower-75, for improving the heat absorbing from the environment, through the system walls-35, to provide a continuous supply of usable power to the device-20, within the system-30.

As described in FIG. 37, the system-30 can use a mediator liquid-131, that will be used when we dont want that the internal particles-15 that come in contact with the device-20, so this liquid-131 will be flowed on the external surface of the internal container-35, that contain the device-20, and carry on to a heat-exchanger-133, and return back to surround the internal container-35, and keep going in circulation using a pump-134. It can be used for all kinds of the mentioned devices and mechanisms (using: magnets+ions, stoppers, gates, unidirectional membranes, and etc.), for increasing the internal gas pressure in the system, and especially it can be used in the mentioned before mechanisms that inclusive magnets and ions.

Figure 8:
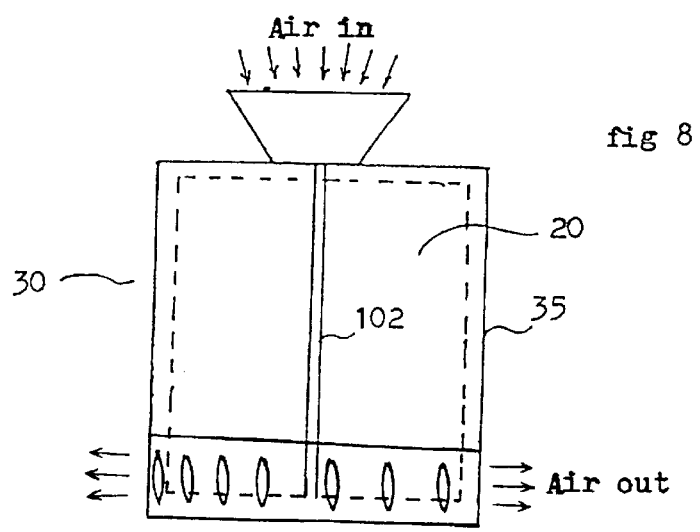
FIG. 8 is a cross sectional view of an open-system with a filter for permitting the entrance of a fluid into the system.
Figure 9:
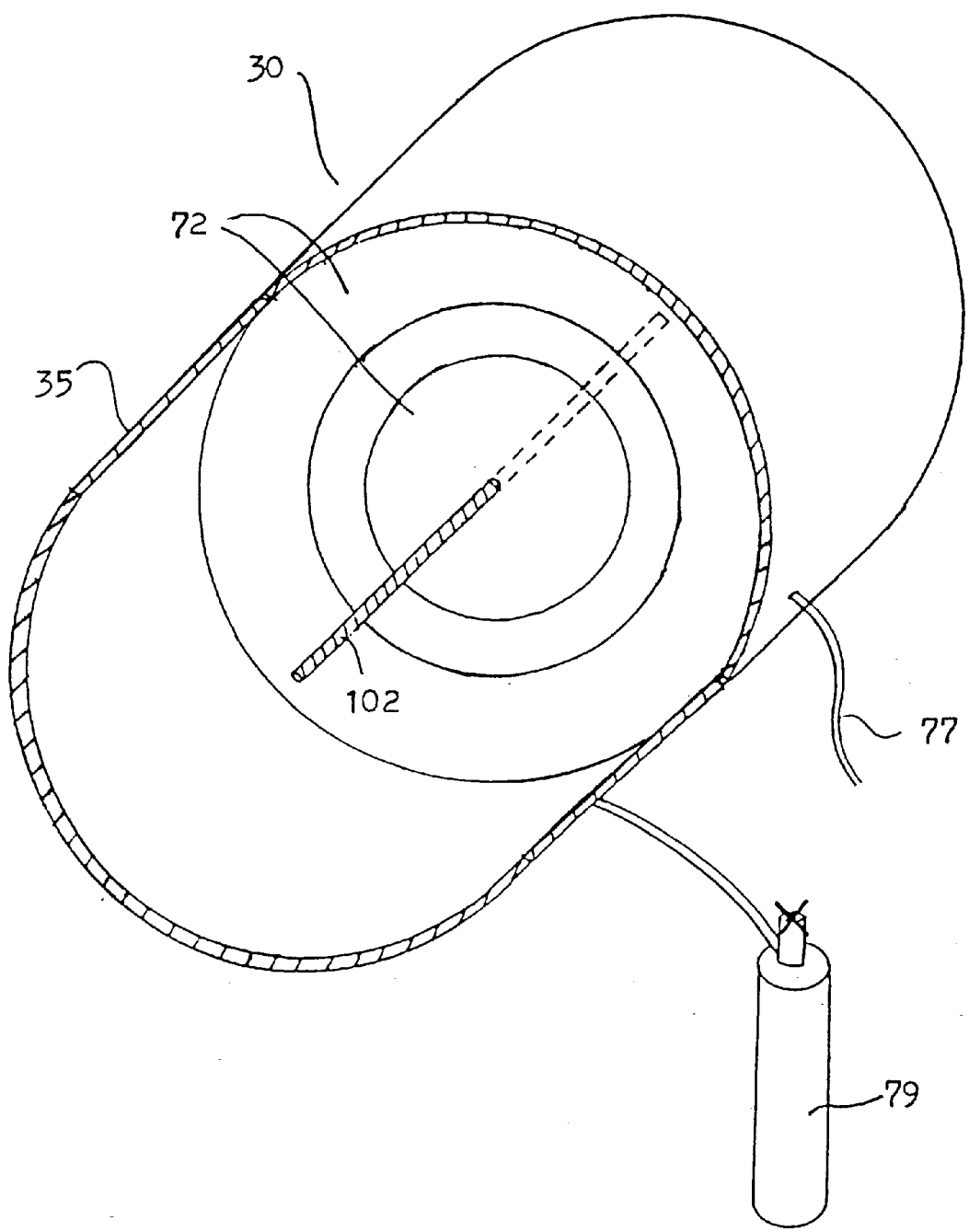
FIG. 9 is a three-dimensional view of means to control the power provided by the system, by controlling the pressure of fluid in the system and the rotation velocity by extending/ shortening the radius of rotation.
Figure 15:
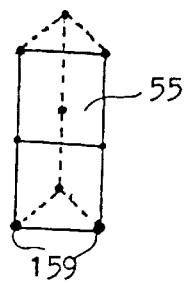
FIG. 15 is a schematic depiction of a stopper molecular according to the present invention.

As shown in FIG. 8, alternatively, the system-30 according to the present invention may be an open system. In this case, the gases and/or liquids from the environment are coming in direct contact with the device-20. There is therefore no need of artificial "heating", but the device, and any part of the system-30 which is in contact with the gases and/or the liquids from the environment, must be chemically-inert to them. Furthermore one would preferably filter the gases and/or the liquids from the environment, to prevent fast powdering of the device's delicate parts.

The quality of the device and the system of absorbing the environmental heat, can be used also for cooling purposes such as cooling refrigerators or air conditioning.

The system can also include a device for storage electricity which contain accumulators and the like, for storage remaining electric energy for use when it needed, such as in very cold night. Also the system can be include different kinds of sources of energy additional the environment heat, for example: a Photo-cells, benzine generators or engines etc.

A system according to the present invention has many utilities:

(a) Connecting the system to a generator may be used to provide electrical energy for homes, businesses, factories, electric-cars and more.

(b) The system can be used to directly operate different kinds of other mechanical devices, such as monitors, propellers, pumps, cars, etc.

(c) The system can be very useful for air-conditioning.

A method for using environmental heat (with no need of temperature difference from the first place), by converting kinetic energy of randomly moving particles (as atoms/molecules clusters thereof) in gas or liquid for example, into a usable form of energy, comprising a mechanism that selectively blocks more particles that move in one general direction, than particles that move in the opposite direction (for example a unidirectional permeable membrane), such that an equivalent vectorial force, $\Sigma Fx$, acting on said mechanism is genereateable, and can provide at least one of the following:

a) A vectorial force that can be used for move a body (as rotor for example) that the said mechanism is attached to;

b) A flow of particles, that for example can be used for operating a turbine;

c) A pressure difference, between two sides of a body that the said mechanism is attached to, especially if the body is a membrane, and the pressure difference can be used for different purposes, for example for moving a piston;

d) A pressure; and e) A subpressure.

Such a method wherein, at least some of the kinetic energy of the said particles, is used for selectively separating between this particles, through the said mechanism, so a vectorial force acting on said mechanism can be generated.

Such a method wherein, the said equivalent vectorial force, is used for moving the body that the said mechanism is attached to, for example a moving turbine.

Such a method wherein, the said mechanism supply a generally flow of particles, for different purposes, such as rotating a turbine.

Such a method, wherein, the said mechanism supply a pressure difference, between the two sides of the body that the said mechanism is attached to, especially if the body is a membrane, and that pressure differences can be used for different purposes, for example: for moving bodies including the said body itself, and moving a turbine.

Such a method wherein, said mechanism includes unidirectional permeable partition that selectively blocks more particles moving in one general direction than particles moving in the opposite general direction, by using for example a unidirectional gates with molecular size, and most of them are facing to the same side of the membrane, so they selectively block more moving particles that come from one direction than moving particles that come from opposite direction.

Such a method wherein, said mechanism includes a tiny unidirectional elements, that their smallest dimension (from the three dimensions x, y, z) can be from 1 angstrom, till 0.2 mm, and at least most of this unidirectional elements are facing the same direction and selectively blocks more particles moving in one general direction than particles moving in the opposite general direction, for example by using a tiny unidirectional gates with molecular size, that most of them are facing to the same side of the membrane, so they selectively blocks more moving particles that come from one direction than moving particles that come from opposite direction, and particularly wherein said mechanism includes a tiny unidirectional gates, that their smallest dimension (from the three dimensions x, y, z) can be from 1 angstrom, till 0.2 mm, and this unidirectional gates are on the same side of the membrane or inside the membrane and at least most of them are facing to the same side of the said membrane and selectively blocks more moving particles that move in one general direction than particles that move in the opposite direction, or wherein said mechanism includes a tiny unidirectional stoppers, that their smallest dimension (from the three dimensions x, y, z) can be from 1 angstrom, till 0.2 mm, and that selectively blocks more particles moving in one general direction than particles moving in the opposite general direction, and this tiny unidirectional stoppers are installed on or in a body (also a surface) and at least most of them are facing to the same direction, so they cause a general flow of particles because of their operation.

Such a method wherein, said particles are ions and the mechanism use a magnetic field that can be created by a magnet (also meaning an electromagnet), which separates ions by the direction of their movements, and by this we cause ions that move in the same general direction hit muzzles from one side of this muzzles, so we selectively block more ions from one side of the said muzzles, than their other side.

A device for using environmental heat, by converting kinetic energy of randomly moving particles, as atoms/molecules in gas or liquid for example, into a usable form of energy, the said device comprising, at least one mechanism, that can be installed on a body and can selectively block more particles that move in one general direction, than particles that move in the opposite direction, such that an equivalent vectorial force, $\Sigma Fx$, is acting on said mechanism is generateable, and can provide at least one of the following:

a) A vectorial force that can be used for moving a body that the said mechanism is attached to.
b) A flow of particles, that can be used for example, for operating a turbine.
c) A pressure difference, between the two sides of a body that the mechanism is attached to, especially if the body is a membrane, and the pressure difference can be used for different purposes, as moving a turbine for example.

Such a device wherein, at least some of the kinetic energy of the said particles, is used for selectively separating between the particles, through the said mechanism, so a vectorial force acting on said mechanism is generateable.

Such a device wherein said particles that come in contact with the said mechanism, are chemically inert.

Such a device wherein, said mechanism includes unidirectional permeable partition that selectively blocks more particles moving in one general direction than particles moving in the opposite general direction, by using for example a tiny unidirectional gate with molecular size, and most of them are facing to the same side of the membrane, so they selectively block more moving particles that come from one direction than moving particles that come from the opposite direction.

Such a device wherein the said mechanism includes the said partition comprising of thin surface as ceramics or plastic for example, covered with a very thin plating of metal (less than 0.2 mm), so more little particles, for example hydrogen molecules, can pass through it in one direction than in the opposite direction.

Such a device wherein the said mechanism comprising of a tiny unidirectional element, that their smallest dimension (from the three dimensions x, y, z) can be from 1 angstrom, till 0.2 mm, and at least most of them are facing the same direction and selectively blocks more particles moving in one general direction than particles moving in the opposite general direction, for example by using a tiny unidirectional gates with molecular size, and most of them are facing to the same side of the membrane, so they selectively block more moving particles that come from one direction than moving particles that come from the opposite direction, particularly wherein said tiny elements includes a movable part that blocks more moving particles that come from one direction than from the opposite direction, and more particularly wherein the mass of the said movable parts of each of the said tiny elements will be similar (the element mass can be between quarter from the particle mass till four times bigger than the particle mass) to the mass of the moving particles.

Such a device wherein the said tiny elements are stationary.

Such a device wherein each of the said tiny elements has holes, in a surface, that let passing through of more particles in one direction than in the opposite direction.

Such a device wherein the said unidirectional elements are unidirectional gates, particularly wherein each of the said tiny unidirectional gates will have a movable part, and more particularly wherein the said movable parts mass of each of the said gates will be similar (the movable mass can be between quarter from the particle mass till four times bigger than the particle mass) to the mass of the moving particles.

Such a device wherein the said unidirectional gates will be only on one side of a permeable membrane.

Such a device wherein the said unidirectional gates will be in a permeable membrane, and most of them are facing to the same side of the membrane.

Such a device wherein at least most of the said unidirectional elements are unidirectional stoppers, and particularly wherein each of the said tiny unidirectional stoppers will have a movable part, and more particularly wherein the mass of the said movable parts of each of the said stoppers will be similar (the movable mass can be between quarter from the particle mass till four times bigger than the particle mass) to the mass of the moving particles.

Such a device wherein the said stoppers will be on a surface, and at least most of them are facing to the same direction.

Such a device wherein the said particles are ions and the mechanism comprises a magnet (also an electromagnet), that creates a magnetic field, which separates ions by their movement directions, and cause to more ions moving in one general direction hit muzzles from one side of them, than from their other side.

Such a device that includes a rotor.

Such a device that includes a generator.

Such a device wherein the said mechanism includes muzzles.

Such a device that includes muzzles in addition to the said mechanism.

Such a device wherein the said muzzles are stationary, and prevent a free flow of the moving particles.

Such a device which includes mobile muzzles that can cause the movement of a body they attached to.

Such a device wherein the said particles are ions.

Such a device wherein the said particles are in a gas state, and particularly wherein the said gases boiling point is under $-40°$ C., or wherein the said gases are inert gases.

Such a device wherein the said particles are in a liquid state, particularly wherein the said liquids melting point is under $-50°$ C.

A system for using environmental heat, by converting kinetic energy of randomly moving particles, as atoms/molecules in gas or liquid form for example, into a usable form of energy, the said system comprising at least one device, that comprising at least one mechanism, that can be installed on a body and selectively blocks more particles that move in one general direction, than particles that move in the opposite direction, such that an equivalent vectorial force, ΣFx, is acting on said mechanism is genereateable, and can provide at least one of the following:
  a) A vectorial force that can be used for moving a body that the said mechanism is attached to,
  b) A generally flow of particles, that can be used for example, for operating a turbine.
  c) A pressure difference, between the two sides of a body that the said mechanism is attached to, especially if the body is a membrane, and the pressure difference can be used for different purposes, as moving a turbine for example.

Such a system wherein the said device, through the said mechanism, is used at least some of the kinetic energy of the said particles, for make a selectively separating between the particles, so a vectorial force acting on said mechanism is genereateable.

Such a system that includes in addition to the said device and the said mechanism, also the particles which the said mechanism is come in contact with, and particularly wherein the particles which the said mechanism is come in contact with, are chemically inert.

Such a system wherein the said mechanism includes unidirectional partition that selectively blocks more particles moving in one general direction than particles moving in the opposite direction, and more particularly, wherein the said mechanism includes that said partition comprising a thin surface as ceramics or plastic for example, covered with a very thin (less than 0.2 mm) plating of metal, so more little particles, for example hydrogen molecules, can pass through it in one direction than in the opposite direction.

Such a system comprising the said particles, and the said mechanism which comprises tiny unidirectional elements, that their smallest dimension (from the three dimensional x, y, z) can be from 1 angstrom till 0.2 mm, and can be for example tiny unidirectional gates, and at least most of the elements are unidirectional gates, more particularly wherein the said unidirectional gates, have a movable part, and most particularly wherein the movable parts mass of each of the said gates, will be similar (the movable mass can be between a quarter of the particle mass to four times bigger than the particle mass) to the mass of the moving particles.

Such a system wherein the said unidirectional gates will be only on one side of a permeable membrane.

Such a system wherein at least most of the tiny unidirectional elements are tiny unidirectional stoppers, particularly wherein each of the said tiny unidirectional stoppers will have a movable part, with molecular size, and most particularly wherein the movable parts mass of each of the said tiny stoppers will be similar (the movable mass can be between a quarter of the particle mass to four times bigger than the particle mass) to the mass of the moving particles.

Such a system wherein the said stoppers will be on a surface, and at least most of them are facing in the same direction.

Such a system wherein said stoppers will be in a permeable body, and at least most of them are facing to the same direction.

Such a system wherein the said particles are ions and the mechanism includes a magnet (also an electromagnet), that creates a magnetic field, which separates ions by their movement direction, and cause to more ions moving in one general direction hit muzzles from one side of them, than their other side.

Such a system wherein the said particles are ions and the mechanism includes an electromagnet, that creates a magnetic field, which separates ions by their movement direction, and cause to more ions moving in one general direction hit muzzles from one side of them, than their other side.

Such a system wherein the said mechanism includes muzzles.

Such a system that includes muzzles addition to the said mechanism.

Such a system wherein the said muzzles are stationary, and prevent a free flow of the particles.

Such a system which includes mobile muzzles that can cause the movement of a body they attach to.

Such a system wherein the said particles are ions.

Such a system wherein the said particles are in a gas state, particularly wherein the said gases boiling point is under −40° C., or wherein the said gases are inert gases.

Such a system wherein the said particles are in a liquid state, particularly wherein the said liquids melting point is under −50° C.

Such a system that comprises a rotor.

Such a system that includes a generator.

Such a system that is open to the environment, so particles from the environment are come in some contact with the said mechanism, and particularly that includes a filter that filters the particles that get into said system from the environment.

Such a system that is sealed for passing through of particles from and to the surroundings, and particularly that contains gas, and its capacity is regulated by regulating the gas pressure.

Such a system that includes a heat-exchanger.

Such a system which includes at least one pump.

Such a system that includes at least one bellows.

A mechanism for using environment heat, by converting kinetic energy of randomly moving particles, as atoms/molecules in gas or liquid for example, into a usable form of energy, the said mechanism, that can be installed on a body, is selectively blocks more particles that move in one general direction, than particles that move in the opposite direction, such that an equivalent vectorial force, ΣFx, is acting on said mechanism is genereateable, and can provide at least one of the following:
  a) A vectorial force that can be used for moving a body that the said mechanism is attached to.
  b) A generally flow of particles, that can be used for example, for operating a turbine.
  c) A pressure difference, between the two sides of a body that the mechanism is attached to, especially if the body is a membrane, and the pressure difference can be used
  a) A vectorial force that can be used for moving a body that the said mechanism is attached to.
  b) A flow of particles, that can be used for example, for operating a turbine.
  c) A pressure difference, between the two sides of a body that the mechanism is attached to, especially if the body is a membrane, and the pressure difference can be used for different purposes, as moving a turbine for example.

Such a mechanism, wherein, at least some of the kinetic energy of the said moving particles, is used for the selectively separating between the particles, through the said mechanism.

Such a mechanism wherein said particles that come in contact with the said mechanism, are chemically inert.

Such a mechanism that includes unidirectional partition that selectively blocks more moving particles that move in one general direction than particles that move in the opposite direction, particularly wherein the said partition comprising of thin surface ceramics or plastic for example, covered with a very thin (less than 0.2 mm) plating of metal, so more little particles as hydrogen molecules for example, can pass through it in one direction than in the opposite direction.

Such a mechanism which comprising of a tiny unidirectional elements, that their smallest dimension (from the three dimensions x, y, z) can be from 1 angstrom, till 0.2 mm, and can be for example as a tiny unidirectional gates, and at least most of this elements are facing to the same direction, particularly wherein the said tiny elements are include a moveable part that will block more particles that come from one direction than from the opposite direction, and more particularly wherein the moveable parts mass of each of the said tiny elements will be similar (the movable mass can be between quarter from the particle mass till four times bigger than the particle mass) to the mass of the moving particles.

Such a mechanism wherein the said tiny elements are stationary.

Such a mechanism wherein each of the said tiny elements has a hole, that let passing through of more particles in one direction than to the opposite direction Such a mechanism wherein the said unidirectional elements are unidirectional gates, particularly wherein each of the said unidirectional gates will have a moveable part, and more particularly wherein the moveable parts mass of each of the said gates will be similar (the moveable mass can be between quarter from the particle mass till four times bigger than the particle mass) to the mass of the moving particles.

Such a mechanism wherein the said unidirectional gates will be only on one side of a permeable membrane.

Such a mechanism wherein the unidirectional gates will be in a permeable membrane, and most of them are facing to the same side of the mechanism.

Such a mechanism wherein at least most of the said tiny unidirectional elements are tiny unidirectional stoppers, particularly wherein each of the said tiny unidirectional stoppers will have a moveable part, with molecular size, and more particularly wherein the moveable parts mass of each of the said tiny stoppers will be similar (the moveable mass can be between quarter from the particle mass till four times bigger than the particle mass) to the mass of the moving particles.

Such a mechanism wherein the said stoppers will be on a surface, and at least most of them are facing to the same direction.

Such a mechanism wherein the said particles are ions and the mechanism comprising a magnet (also an electromagnet), that create a magnetic field, which separate ions by their movements direction, and cause to more ions moving in one general direction hit muzzles from one side of them, than their other side.

Such a mechanism that includes muzzles, particularly wherein the said muzzles are stationary, and prevent a free flow of the moving particles or wherein include mobile muzzles that can cause the movement of a body they attached to.

Such a mechanism wherein the said particles are ions.

A method for manufacturing a mechanism which converting kinetic energy of randomly moving particles into a usable form of energy, comprising the steps of:
(a) obtaining a surface;
(b) obtaining a substance that its molecules can be used as tiny unidirectional stoppers, that can be maneuvered under an appropriate vectorial force, for example: a magnetic force or electric force;
(c) attaching the said stoppers molecules to the said surface, by using of chemical processes, during operate the said appropriate vectorial force on this stoppers in one direction.

Such a method that uses one of the following chemical processes: a) Virts reaction; b) using a Griniar operation; c) using NaOH/KOH.

A method for manufacturing a mechanism for converting kinetic energy of randomly moving particles into a usable form of energy, comprising the steps of:
(a) obtaining a permeable surface (like a permeable membrane);
(b) obtaining a substance that its molecules can be used as tiny unidirectional gates, and their size is enough bigger related the membranes holes, so this molecules can't passing through the said permeable surface;
(c) attaching the said gates molecules to only one side of the said surface, by using of chemical processes. Such a method that uses one of the following chemical processes: a) Virts reaction; (b) using a Griniar operator; (c) using NaOH/KOH.

While the invention has been described with respect to a limited number of embodiments, it will be appreciated that many variations, modifications and other applications of the invention may be made.

What is claimed is:

1. A system for converting an environmental heat energy into a usable motive energy comprising:
   (i) a plurality of randomly moving particles selected from the group consisting of atoms, molecules, and clusters thereof;
   (ii) a first compartment containing at least part of said randomly moving particles;
   (iii) a second compartment containing a remaining part of said randomly moving particles;
   (iv) an at least one device interdisposed between said first and second compartments for generating a positive pressure gradient thereacross by the passage of more particles therethrough passing from any one of the compartments to the other compartment than vice versa; and
   (v) a transmission system driven by said positive pressure gradient for providing said usable motive power,
   the system wherein the particles are used as mediators between environment and said device in converting at first the environmental heat energy into kinetic energy of said randomly moving particles and then converting said kinetic energy into said usable motive power;
   wherein said device includes at least one mechanism that is adapted to perform at least one operation selected from the group consisting of: (1) changing selectively a direction of movement of the particles in one general direction than in the opposite direction, (2) blocking selectively a movement of the particles moving in one general direction than in the opposite direction, (3) passing selectively through more particles moving in one general direction than particles moving in the opposite direction;
   wherein said mechanism comprises a permeable plate having a plurality of unidirectional elements enabling a particle flow in a predetermined direction; and
   wherein said unidirectional elements are stationary gates.

2. The system of claim 1, wherein said stationary gates are holes passing through the plate.

3. The system of claim 2, wherein the opening of each hole at one side of the plate is larger than the opening at the other side of the plate.

4. The system of claim 1 wherein said gates are arranged on said permeable plate.

5. The system of claim 4, wherein a mass of the moveable part is in the range of a quarter of a particle mass to four times of the particle mass.

6. A system for converting an environmental heat energy into a usable motive energy comprising:
(i) a plurality of randomly moving particles selected from the group consisting of atoms, molecules, and clusters thereof;
(ii) a first compartment containing at least part of said randomly moving particles;
(iii) a second compartment containing a remaining part of said randomly moving particles;
(iv) an at least one device interdisposed between said first and second compartments for generating a positive pressure gradient thereacross by the passage of more particles therethrough passing from any one of the compartments to the other compartment than vice versa; and
(v) a transmission system driven by said positive pressure gradient for providing said usable motive power,
the system wherein the particles are used as mediators between environment and said device in converting at first the environmental heat energy into kinetic energy of said randomly moving particles and then converting said kinetic energy into said usable motive power;
wherein said device includes at least one mechanism that is adapted to perform at least one operation selected from the group consisting of: (1) changing selectively a direction of movement of the particles in one general direction than in the opposite direction, (2) blocking selectively a movement of the particles moving in one general direction than in the opposite direction, (3) passing selectively through more particles moving in one general direction than particles moving in the opposite direction;
wherein said mechanism comprises a permeable plate having a plurality of unidirectional elements enabling a particle flow in a predetermined direction; and
wherein said unidirectional elements are moveable gates having a moveable part, the gates are arranged in or on said permeable plate.

7. The system of claim 6 wherein said gates are arranged in said permeable plate.

8. The system of claim 7, wherein a mass of the moveable part is in the range of a quarter of a particle mass to four times of the particle mass.

9. A system for converting an environmental heat energy into a usable motive energy comprising:
(i) a plurality of randomly moving particles selected from the group consisting of atoms, molecules, and clusters thereof;
(ii) a first compartment containing at least part of said randomly moving particles;
(iii) a second compartment containing a remaining part of said randomly moving particles;
(iv) an at least one device interdisposed between said first and second compartments for generating a positive pressure gradient thereacross by the passage of more particles therethrough passing from any one of the compartments to the other compartment than vice versa; and
(v) a transmission system driven by said positive pressure gradient for providing said usable motive power,
the system wherein the particles are used as mediators between environment and said device in converting at first the environmental heat energy into kinetic energy of said randomly moving particles and then converting said kinetic energy into said usable motive power;
wherein said device includes at least one mechanism that is adapted to perform at least one operation selected from the group consisting of: (1) changing selectively a direction of movement of the particles in one general direction than in the opposite direction, (2) blocking selectively a movement of the particles moving in one general direction than in the opposite direction, (3) passing selectively through more particles moving in one general direction than particles moving in the opposite direction;
wherein said mechanism comprises a plurality of unidirectional elements enabling a particle flow in a predetermined direction; and
wherein said unidirectional elements are unidirectional stationary stoppers.

10. A device for converting kinetic energy of randomly moving particles selected from a group consisting of atoms, molecules, and clusters thereof into a usable form of power by using at least one mechanism adapted to perform at least one operation selected from the group consisting of:
(i) changing a direction of movement of the particles;
(ii) blocking selectively more particles moving in one general direction than particles moving in opposite direction;
(iii) passing through more particles moving in the one direction than particles moving in the opposite direction;
thereby the mechanism can provide at least one of the following:
(a) a positive force gradient for moving a body when it is coupled with said mechanism;
(b) a flow of particles along or through said mechanism for driving a turbine when it is coupled with said mechanism;
(c) a positive pressure gradient for creating said flow;
wherein said mechanism is adapted to perform at least one operation selected from the group consisting of (1) changing selectively a direction of movement of the particles in one general direction than in the opposite direction, (2) blocking selectively a movement of the particles moving in one general direction than in the opposite direction, (3) passing selectively through more particles moving in one general direction than particles moving in the opposite direction;
wherein said mechanism comprises a permeable plate having a plurality of unidirectional elements enabling a particle flow in a predetermined direction; and
wherein said unidirectional elements are stationary gates.

11. The device of claim 10, wherein said stationary gates are holes passing through the plate.

12. The device of claim 11, wherein the opening of each hole at one side of the plate is bigger than the opening at the other side of the plate.

13. A device for converting kinetic energy of randomly moving particles selected from a group consisting of atoms, molecules, and clusters thereof into a usable form of power by using at least one mechanism adapted to perform at least one operation selected from the group consisting of:
(i) changing a direction of movement of the particles;
(ii) blocking selectively more particles moving in one general direction than particles moving in opposite direction;
(iii) passing through more particles moving in the one direction than particles moving in the opposite direction;

thereby the mechanism can provide at least one of the following:
(a) a positive force gradient for moving a body when it is coupled with said mechanism;
(b) a flow of particles along or through said mechanism for driving a turbine when it is coupled with said mechanism;
(c) a positive pressure gradient for creating said flow;
wherein said mechanism is adapted to perform at least one operation selected from the group consisting of (1) changing selectively a direction of movement of the particles in one general direction than in the opposite direction, (2) blocking selectively a movement of the particles moving in one general direction than in the opposite direction, (3) passing selectively through more particles moving in one general direction than particles moving in the opposite direction;
wherein said mechanism comprises a permeable plate having a plurality of unidirectional elements enabling a particle flow in a predetermined direction; and
wherein said unidirectional elements are moveable gates having a movable part, and the gates are arranged in or on said permeable plate.

14. The device of claim 13 wherein said gates are arranged in said permeable plate.

15. The device of claim 13 wherein said gates are arranged on said permeable plate.

16. The device of claim 15, wherein a mass of the moveable part is in the range of a quarter of a particle mass to four times of the particle mass.

17. The device of claim 14, wherein a mass of the moveable part is in the range of a quarter of a particle mass to four times of the particle mass.

18. A device for converting kinetic energy of randomly moving particles selected from a group consisting of atoms, molecules, and clusters thereof into a usable form of power by using at least one mechanism adapted to perform at least one operation selected from the group consisting of:
(i) changing a direction of movement of the particles;
(ii) blocking selectively more particles moving in one general direction than particles moving in opposite direction;
(iii) passing through more particles moving in the one direction than particles moving in the opposite direction;
thereby the mechanism can provide at least one of the following:
(a) a positive force gradient for moving a body when it is coupled with said mechanism;
(b) a flow of particles along or through said mechanism for driving a turbine when it is coupled with said mechanism;
(c) a positive pressure gradient for creating said flow;
wherein said mechanism is adapted to perform at least one operation selected from the group consisting of (1) changing selectively a direction of movement of the particles in one general direction than in the opposite direction, (2) blocking selectively a movement of the particles moving in one general direction than in the opposite direction, (3) passing selectively through more particles moving in one general direction than particles moving in the opposite direction;
wherein said mechanism comprises a plurality of unidirectional elements enabling a particle flow in a predetermined direction; and
wherein said unidirectional elements are unidirectional stationary stoppers.

19. A device for converting kinetic energy of randomly moving particles selected from a group consisting of atoms, molecules, and clusters thereof into a usable form of power by using at least one mechanism adapted to perform at least one operation selected from the group consisting of:
(i) changing a direction of movement of the particles;
(ii) blocking selectively more particles moving in one general direction than particles moving in opposite direction;
(iii) passing through more particles moving in the one direction than particles moving in the opposite direction;
thereby the mechanism can provide at least one of the following:
(a) a positive force gradient for moving a body when it is coupled with said mechanism;
(b) a flow of particles along or through said mechanism for driving a turbine when it is coupled with said mechanism;
(c) a positive pressure gradient for creating said flow;
wherein said mechanism is adapted to perform at least one operation selected from the group consisting of (1) changing selectively a direction of movement of the particles in one general direction than in the opposite direction, (2) blocking selectively a movement of the particles moving in one general direction than in the opposite direction, (3) passing selectively through more particles moving in one general direction than particles moving in the opposite direction;
wherein said mechanism comprises a plurality of unidirectional elements enabling a particle flow in a predetermined direction; and
wherein said unidirectional elements are stoppers having a moveable part.

20. The device of claim 19, wherein a mass of the moveable part is in the range of a quarter of a particle mass to four times of the particle mass.

21. An apparatus for utilization of environmental energy by converting kinetic energy of randomly moving particles of environment into a usable motive power, wherein the particles of environment are selected from the group consisting of atoms, molecules, and clusters thereof, the system comprising:
(i) at least one device comprising at least one mechanism in a form of a body having a plurality of unidirectional elements selectively blocking or changing a movement direction of more particles that move in one general direction, than particles moving in the opposite direction, and whereby forming a resulting force acting on said mechanism in one direction larger than in the opposite direction and creating a positive force gradient;
(ii) a transmission system driven by resulting force for providing a usable motive power;
wherein said mechanism comprising a plurality of unidirectional elements enabling a particle flow in a predetermined direction; and
wherein said unidirectional elements are unidirectional stationary stoppers.

22. The apparatus of claim 21, wherein said unidirectional stopper are having a moveable part.

23. The apparatus of claim 22, wherein a mass of the moveable part is in the range of a quarter of a particle mass to four times of the particle mass.

24. An apparatus for utilization of environmental energy by converting kinetic energy of randomly moving particles of environment into a usable motive power, wherein the particles of environment are selected from the group consisting of atoms, molecules, and clusters thereof, the system comprising:

(1) at least one device comprising at least one mechanism in a form of a body having a plurality of unidirectional elements selectively blocking or changing a movement direction of more particles that move in one general direction, than particles moving in the opposite direction, and whereby forming a resulting force acting on said mechanism in one direction larger than in the opposite direction and creating a positive force gradient;

(2) a transmission system driven by resulting force for providing a usable motive power;

a container for containing said device and said randomly moving particles;

wherein said randomly moving particles are electrically charged particles and said mechanism is in a form of a body having a magnet for creating a magnetic field for selective diverting the charged particles in a predetermined direction, the mechanism comprising at least one muzzle for blocking a portion of the diverted particles and thereby forming a resulting force acting on said mechanism in one direction larger than in the opposite direction and creating a positive force gradient.

25. The apparatus of claim 24, wherein said muzzles prevent a free flow of the moving particles.

* * * * *